US009457344B2

(12) United States Patent
McCool et al.

(10) Patent No.: US 9,457,344 B2
(45) Date of Patent: Oct. 4, 2016

(54) MIXED PHASE OXIDE CATALYSTS

(71) Applicant: SHUBIN, INC., Los Altos, CA (US)

(72) Inventors: Geoffrey McCool, Hayward, CA (US); Xianghong Hao, Kingwood, TX (US); Deepak Srivastava, San Jose, CA (US); Bulent Yavuz, Westfield, NJ (US)

(73) Assignee: Shubin, Inc., Los Altos, CA (US)

( * ) Notice: Subject to any disclaimer, the term of this patent is extended or adjusted under 35 U.S.C. 154(b) by 205 days.

(21) Appl. No.: 14/346,405

(22) PCT Filed: Sep. 21, 2012

(86) PCT No.: PCT/US2012/056686
§ 371 (c)(1),
(2) Date: Mar. 21, 2014

(87) PCT Pub. No.: WO2013/044115
PCT Pub. Date: Mar. 28, 2013

(65) Prior Publication Data
US 2014/0219878 A1 Aug. 7, 2014

Related U.S. Application Data

(60) Provisional application No. 61/561,771, filed on Nov. 18, 2011, provisional application No. 61/538,730, filed on Sep. 23, 2011.

(51) Int. Cl.
*B01D 50/00* (2006.01)
*B01J 29/076* (2006.01)
(Continued)

(52) U.S. Cl.
CPC ............ *B01J 29/076* (2013.01); *B01D 53/944* (2013.01); *B01D 53/9477* (2013.01); *B01J 21/04* (2013.01);
(Continued)

(58) Field of Classification Search
CPC ..................... F01N 2510/063; F01N 2570/18; F01N 3/2066; F01N 13/0097; F01N 3/28; B01D 2255/1021; B01J 2423/00
USPC ............ 422/168, 177; 502/73, 304; 423/247
See application file for complete search history.

(56) References Cited

U.S. PATENT DOCUMENTS 6,221,804 B1   4/2001   Yamada et al.
7,641,875 B1   1/2010   Golden
(Continued)

FOREIGN PATENT DOCUMENTS

CN   101528324 A   9/2009
CN   101848756 A   9/2010
(Continued)

OTHER PUBLICATIONS

Chinese Office Action for Chinese 201280057485.7 dated Nov. 3, 2015.
(Continued)

*Primary Examiner* — Tom P Duong
(74) *Attorney, Agent, or Firm* — Patterson & Sheridan, LLP

(57) ABSTRACT

An emission control catalyst for treating an engine exhaust includes non-precious metal group ("NPGM") mixed phase oxide catalyst having a mullite phase containing optionally in close contact with other metal oxides. The mixed phase catalyst may be included in one or more layers or zones of a multi-layered or multi-zoned emission control catalyst and optionally in combination with precious metal catalysts such as Pt, Pd and Au.

21 Claims, 14 Drawing Sheets

(51) Int. Cl.
| | | |
|---|---|---|
| F01N 3/20 | (2006.01) | |
| F01N 3/035 | (2006.01) | |
| B01D 53/94 | (2006.01) | |
| B01J 37/02 | (2006.01) | |
| B01J 37/03 | (2006.01) | |
| B01J 35/00 | (2006.01) | |
| B01J 21/04 | (2006.01) | |
| B01J 21/12 | (2006.01) | |
| B01J 23/00 | (2006.01) | |
| B01J 23/02 | (2006.01) | |
| B01J 23/34 | (2006.01) | |
| B01J 23/42 | (2006.01) | |
| B01J 23/44 | (2006.01) | |
| B01J 23/75 | (2006.01) | |
| B01J 23/83 | (2006.01) | |
| B01J 29/06 | (2006.01) | |
| B01J 29/068 | (2006.01) | |
| B01J 35/02 | (2006.01) | |
| B01J 35/04 | (2006.01) | |
| B01J 35/10 | (2006.01) | |
| B01J 37/00 | (2006.01) | |
| F01N 13/00 | (2010.01) | |
| B01J 29/072 | (2006.01) | |
| F01N 3/28 | (2006.01) | |
| B01J 23/644 | (2006.01) | |

(52) U.S. Cl.
CPC ............ *B01J 21/12* (2013.01); *B01J 23/002* (2013.01); *B01J 23/005* (2013.01); *B01J 23/02* (2013.01); *B01J 23/34* (2013.01); *B01J 23/42* (2013.01); *B01J 23/44* (2013.01); *B01J 23/75* (2013.01); *B01J 23/83* (2013.01); *B01J 29/061* (2013.01); *B01J 29/068* (2013.01); *B01J 29/072* (2013.01); *B01J 35/002* (2013.01); *B01J 35/0006* (2013.01); *B01J 35/023* (2013.01); *B01J 35/04* (2013.01); *B01J 35/1019* (2013.01); *B01J 37/009* (2013.01); *B01J 37/0018* (2013.01); *B01J 37/0036* (2013.01); *B01J 37/0201* (2013.01); *B01J 37/0244* (2013.01); *B01J 37/0246* (2013.01); *B01J 37/031* (2013.01); *B01J 37/038* (2013.01); *F01N 3/035* (2013.01); *F01N 3/2066* (2013.01); *F01N 3/28* (2013.01); *F01N 13/0097* (2014.06); *B01D 2255/1021* (2013.01); *B01D 2255/1023* (2013.01); *B01D 2255/204* (2013.01); *B01D 2255/206* (2013.01); *B01D 2255/2042* (2013.01); *B01D 2255/2065* (2013.01); *B01D 2255/2073* (2013.01); *B01D 2255/20746* (2013.01); *B01D 2255/40* (2013.01); *B01D 2255/50* (2013.01); *B01D 2255/903* (2013.01); *B01D 2255/9022* (2013.01); *B01D 2255/9025* (2013.01); *B01J 23/6447* (2013.01); *B01J 2523/00* (2013.01); *F01N 2370/02* (2013.01); *F01N 2510/063* (2013.01); *F01N 2510/0682* (2013.01); *F01N 2510/0684* (2013.01); *F01N 2570/18* (2013.01); *Y02T 10/24* (2013.01)

(56) References Cited

U.S. PATENT DOCUMENTS

| | | | |
|---|---|---|---|
| 2004/0151647 A1* | 8/2004 | Wanninger | B01D 53/864 423/247 |
| 2009/0324468 A1* | 12/2009 | Golden | B01D 53/945 423/210 |
| 2009/0325792 A1* | 12/2009 | Oljaca | B01D 53/945 502/303 |
| 2010/0242458 A1 | 9/2010 | Suzuki et al. | |
| 2011/0126527 A1 | 6/2011 | Hilgendorff | |

FOREIGN PATENT DOCUMENTS

| | | |
|---|---|---|
| CN | 102149462 A | 8/2011 |
| EP | 0789621 B1 | 5/1999 |
| JP | 2002-292246 A | 10/2002 |
| KR | 2009-0083386 A | 8/2009 |

OTHER PUBLICATIONS

Partial European Search Report for Application No. 12833139.4-1351 /2758643 PCT/US2012/056686 dated Jun. 25, 2015.
International Search Report and Written Opinion, PCT/US2012/056686, Feb. 28, 2013.

* cited by examiner

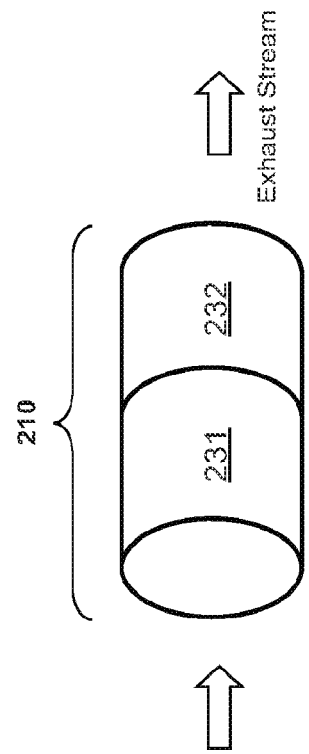
FIG. 3B
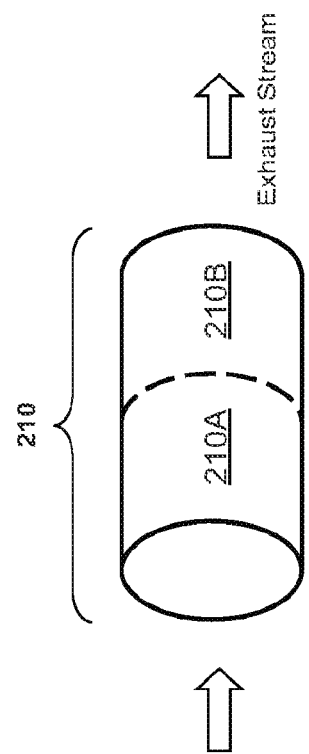
FIG. 3D
FIG. 3A
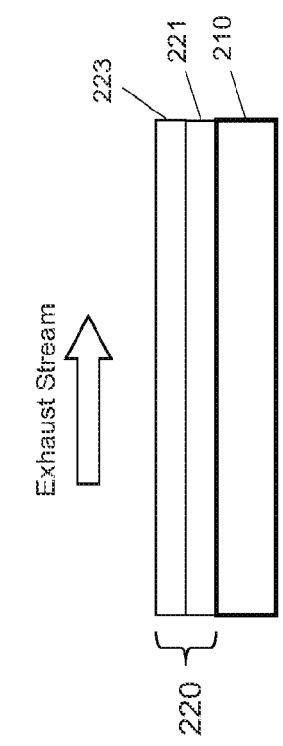
FIG. 3C

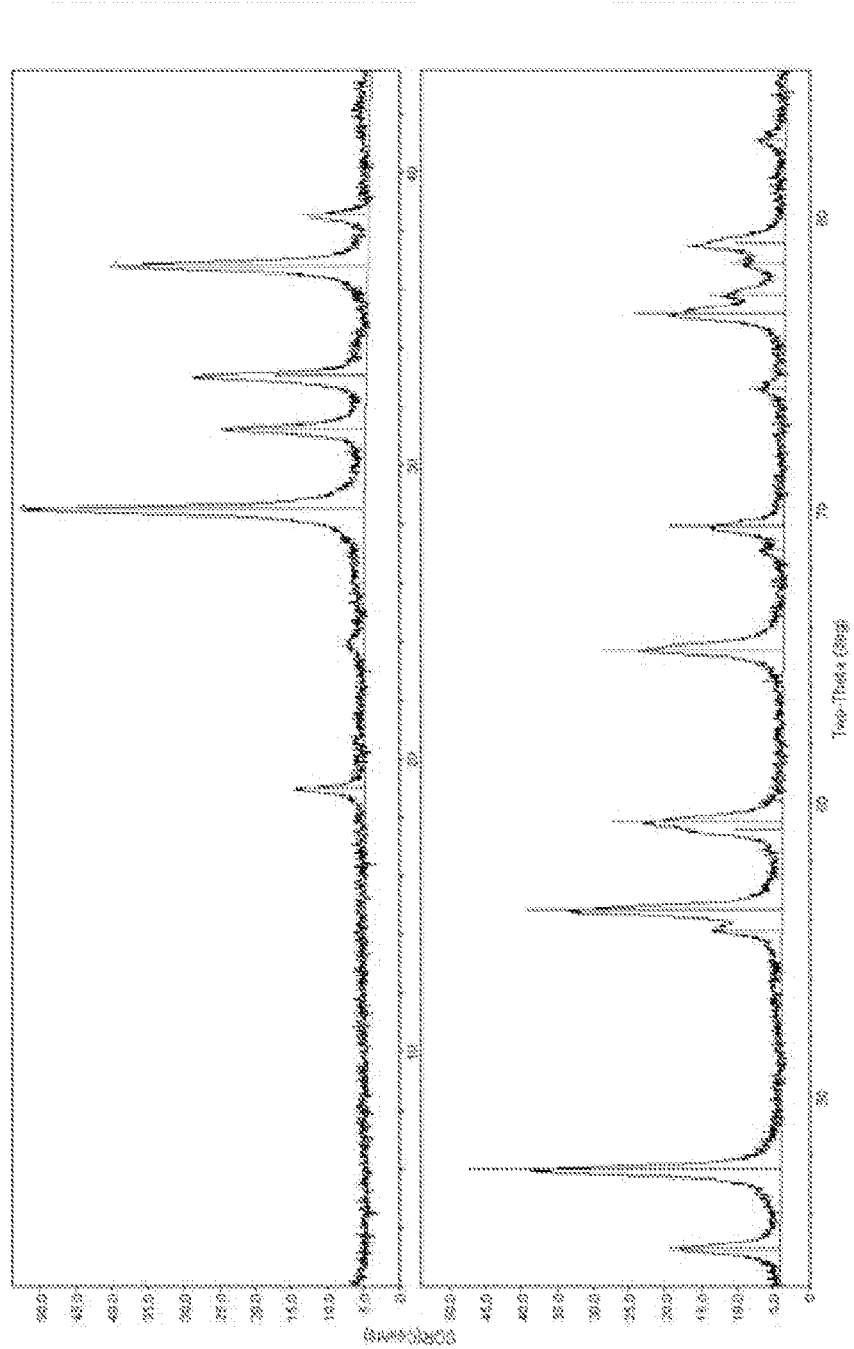
Figure 4 - Phase identification for sample 2

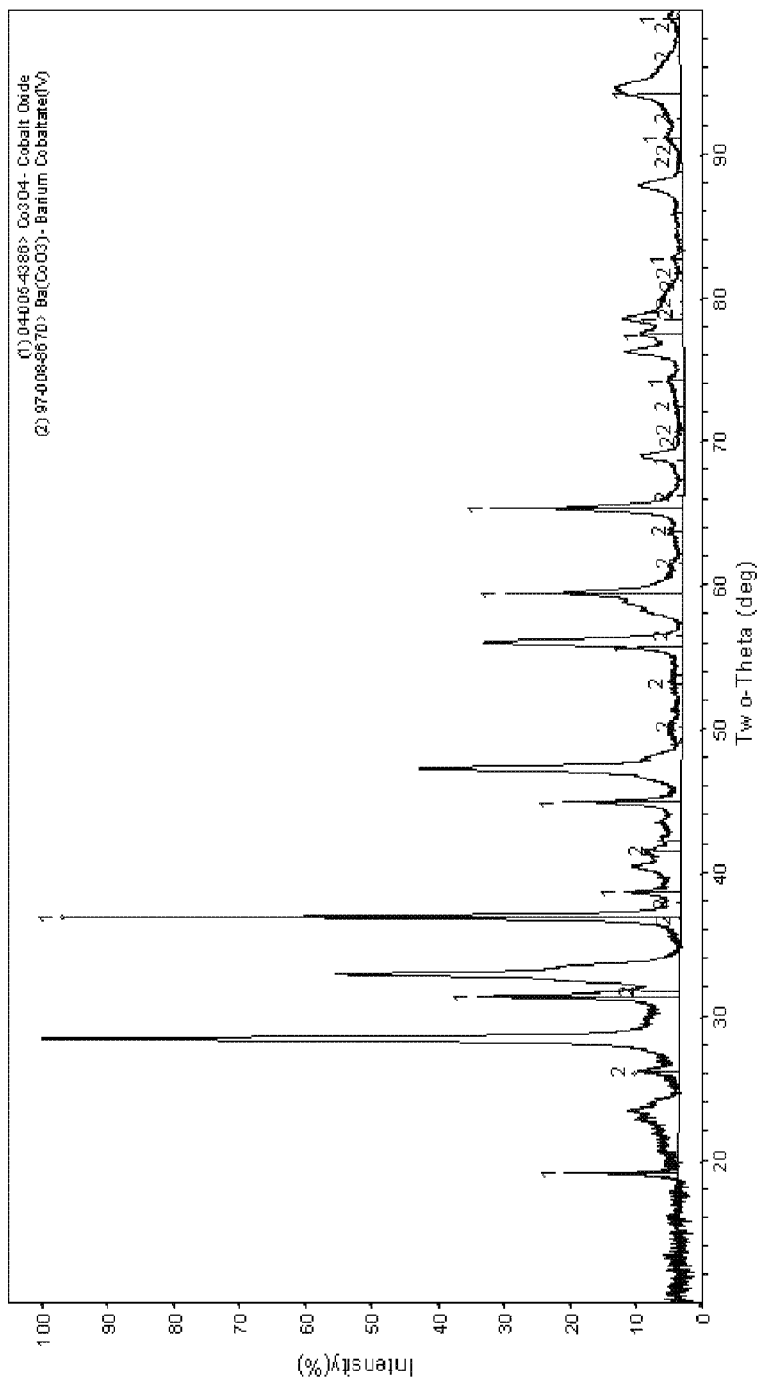
Figure 5 – Phase identification for sample 5

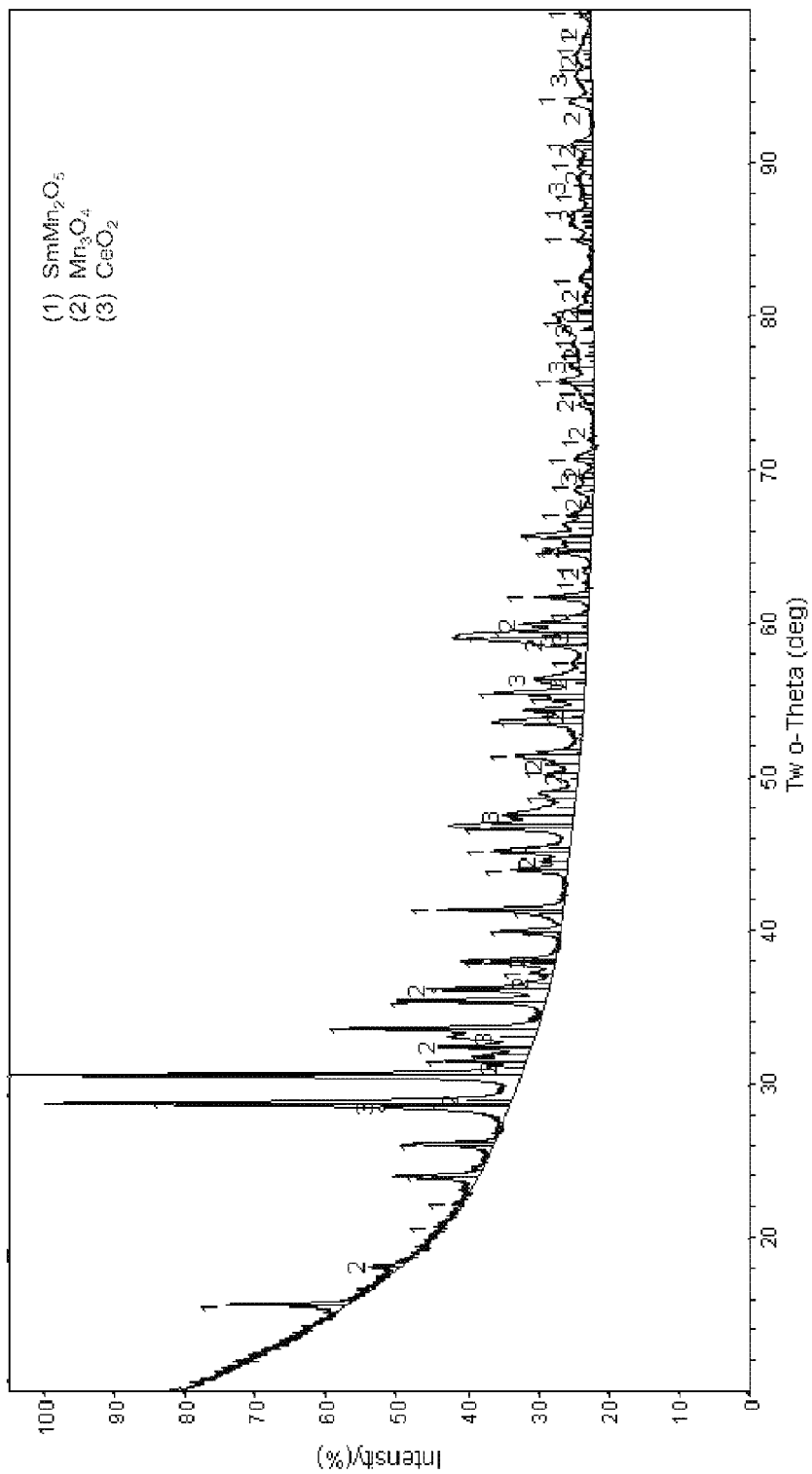

MIXED PHASE OXIDE CATALYSTS

BACKGROUND OF THE INVENTION

1. Field of the Invention

Embodiments of the present invention are directed to mixed phase oxide catalysts. Particularly, embodiments of the present invention are directed to emission control catalysts containing a mixed phase oxide compound.

2. Description of the Related Art

Nitrogen oxides (NOx) abatement is one of the key concerns for lean burn engines such as diesel engines. One solution has been to oxidize the nitric oxide in the emission gases, as the oxidized $NO_2$ assists the oxidation of soot and promotes denox reactions in the downstream devices like SCR and LNT. Platinum based catalysts have been successfully used to oxidize the nitric oxide. However, platinum is a relatively high cost material.

In this respect, catalyst developers are continually exploring ways to use alternative metals that are less costly. There is, therefore, a need for suitable non-precious group metals for use as catalysts.

SUMMARY OF THE INVENTION

Embodiments of the present invention are direct to mixed phase catalysts having at least a spinel phase in combination with a fluorite phase and/or a mullite phase.

Embodiments of the present invention provide mixed phase catalysts containing at least two phases selected from a fluorite phase containing a cerium oxide, a spinel phase containing a metal oxide, and a mullite phase containing a metal oxide. In one embodiment, the metal oxide is selected from the group consisting of cobalt, manganese, nickel, copper, iron, and, combinations thereof. In another embodiment, the metal oxide includes a dopant selected from the group consisting of alkali metals, alkaline earth metals, and combinations thereof. In yet another embodiment, the catalyst includes a second dopant selected from the group consisting of yttrium, zirconium, hafnium, lanthanides, and combinations thereof.

In another embodiment, an engine exhaust system includes a catalytic oxidation reactor having a mixed phase oxide catalyst supported on a substrate, wherein the mixed phase oxide catalyst includes at least two phases selected from a fluorite phase containing a cerium oxide; a spinel phase containing a metal oxide, and a mullite phase containing a metal oxide. In one variation, the metal oxide is selected from the group consisting of cobalt oxide and manganese oxide. In another variation, the substrate includes multiple washcoat zones or layers, wherein the mixed phase oxide catalyst is included in at least one of the washcoat zones or layers.

A catalyst according to another embodiment has the general formula:

$$Ce_{1-x}A_{x+a}B_{y+b}M_{z-y}O_s \qquad (I)$$

where:
M is one or more metal elements selected from the group consisting of transition metals;
A is one or more metal elements selected from the group consisting of transition metals, poor metals and the Lanthanide series, wherein A and M are different metals;
B is one or more metal elements selected from the group consisting of alkali metals and alkaline earth metals;
x is a number defined by $0<=x<=1$,
a is a number defined by $a=>-1$,
y and z are numbers defined by $0<=y<=z$,
b is a number defined $b=>0$, and
s is a number that renders the catalyst substantially charge neutral, In one embodiment, M in Formula I may be an element selected from the group consisting of Ti, V, Cr, Mn, Fe, Co, Ni, Cu, Zn, and combinations thereof. In another embodiment, M is selected from the group consisting of V, Cr, Mn, Fe, Co, Ni, Cu and combinations thereof. In yet another embodiment, M is selected from the group consisting of Co, Mn, Cr, Fe, and combinations thereof.

In one embodiment, A in Formula I may be an element or a mixture of elements selected from the lanthanide series. In another embodiment, A is selected from the group consisting of Pr, Nd, Sm, Eu, Gd, Tb, Dy, Ho, Er, Tm, Yb Bi Zr, Sn, Y, La and combinations thereof.

In one embodiment, B in Formula I may be an element or a mixture of elements from the alkaline earth metals. In another embodiment, B is selected from the group consisting of Ba, Sr, Ca, Cs, Rb K, and combinations thereof. In yet another embodiment, B is selected from the group consisting of Sr, Ba, Ca, Mg, and combinations thereof.

In another embodiment, a mixed phase catalyst has the general formula:

$$(CeO_2)_d(AM_2O_5)_e(B_2M_2O_5)_f(M_3O_4)_g \qquad (II)$$

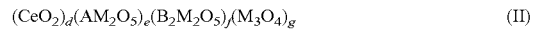

where:
d, e, f, g is a number greater than or equal to zero;
A, B, and M have the same meaning as in formula (I) above;
$CeO_2$ is a fluorite phase;
$A M_2O_5$ and $B_2M_2O_5$ are mullite phases; and
$M_3O_4$ is a spinel phase.

The transition metal M in the mullite phase may be selected from one or more of the transition metals. The dopants A and B in the mullite phase may be selected from the group consisting of alkali metals, alkaline earth metals, poor metals, transition metals, lanthanides, and their combinations.

In another embodiment, any of the above mixed phase catalysts may be used as an emission control catalyst and may be applied to one or more selected brick, zone, or layer in a multi-brick, multi-zoned, or multi-layered emission control systems to provide a boost in oxidation performance of the overall system and/or a cost reduction. In yet another embodiment, the mixed phase catalyst may be used in a single layer or zone emission control catalyst. In yet another embodiment, a platinum based catalysts or other suitable catalysts may be included in a same of different washcoat zones or layers. Zeolites may be added as a hydrocarbon absorbing component in any one of the bricks, zones, or layers.

In another embodiment, an emission control catalyst for treating an engine exhaust includes a first catalytically active layer containing a zeolite; a second catalytically active layer containing non-precious metal group ("NPGM") catalyst according to Formula I or II, wherein the first catalytically active layer is positioned to encounter the engine exhaust before the second catalytically active layer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 3A-3D illustrate different configurations of a substrate for an emission control catalyst.

FIG. 4 is the XRD result for sample 2.

FIG. 5 is the XRD result for sample 5.

FIG. 6 is the XRD result for sample 8.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in the claims. Likewise, reference to "the invention" shall not be construed as a generalization of any inventive subject matter disclosed herein and shall not be considered to be an element or limitation of the appended claims except where explicitly recited in the claims.

FIGS. 1A-1E are schematic representations of different engine exhaust systems in which embodiments of the present invention may be used. The combustion process that occurs in an engine 102 produces harmful pollutants, such as CO, various hydrocarbons, particulate matter, and nitrogen oxides ($NO_x$), in an exhaust stream that is discharged through a tail pipe 108 of the exhaust system.

Figure 1A:
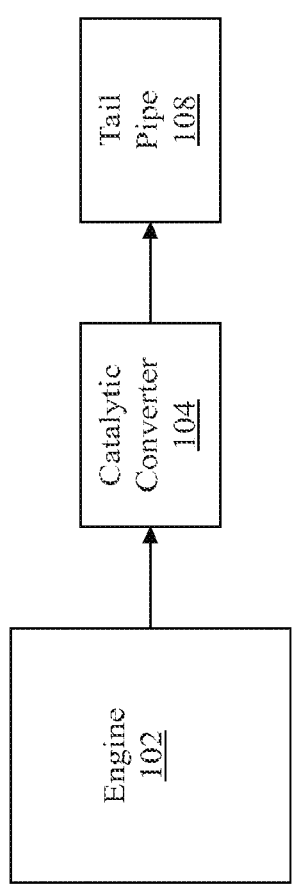
FIGS. 1A-1E are schematic representations of different engine exhaust systems in which embodiments of the present invention may be used.

In the exhaust system of FIG. 1A, the exhaust stream from an engine 102 passes through a catalytic converter 104, before it is discharged into the atmosphere (environment) through a tail pipe 108. The catalytic converter 104 contains supported catalysts coated on a monolithic substrate that treat the exhaust stream from the engine 102. The exhaust stream is treated by way of various catalytic reactions that occur within the catalytic converter 104. These reactions include the oxidation of CO to form $CO_2$, burning of hydrocarbons, and the conversion of NO to $NO_2$.

Figure 1B:
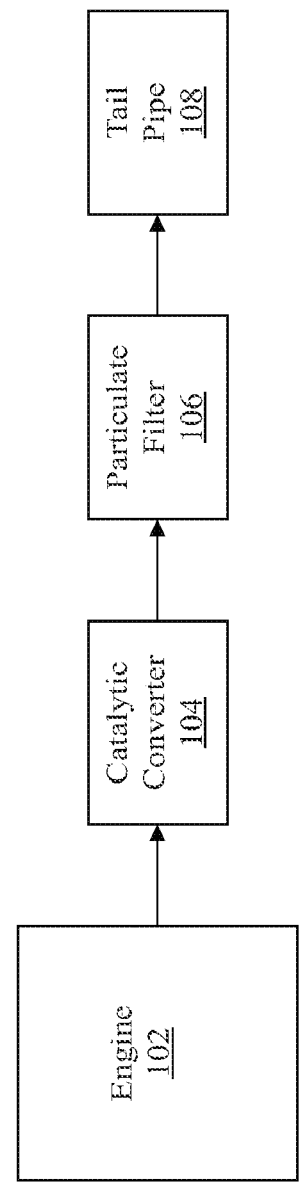

In the exhaust system of FIG. 1B, the exhaust stream from the engine 102 passes through a catalytic converter 104 and a particulate filter 106, before it is discharged into the atmosphere through a tail pipe 108. The catalytic converter 104 operates in the same manner as in the exhaust system of FIG. 1A. The particulate filter 106 traps particulate matter that is in the exhaust stream, e.g., soot, liquid hydrocarbons, generally particulates in liquid form. In an optional configuration, the particulate filter 106 includes a supported catalyst coated thereon for the oxidation of NO and/or to aid in combustion of particulate matter.

Figure 1C:
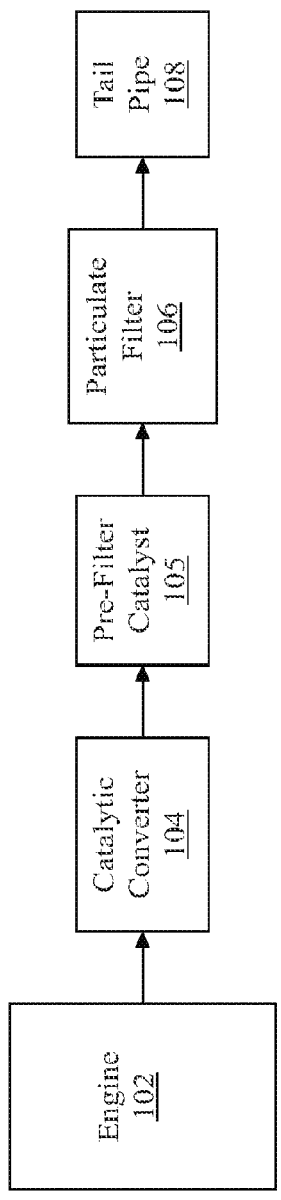

In the exhaust system of FIG. 1C, the exhaust stream from the engine 102 passes through a catalytic converter 104, a pre-filter catalyst 105 and a particulate filter 106, before it is discharged into the atmosphere through a tail pipe 108. The catalytic converter 104 operates in the same manner as in the exhaust system of FIG. 1A. The pre-filter catalyst 105 includes a monolithic substrate and supported catalysts coated on the monolithic substrate for the oxidation of NO. The particulate filter 106 traps particulate matter that is in the exhaust stream, e.g., soot, liquid hydrocarbons, generally particulates in liquid form.

Figure 1D:
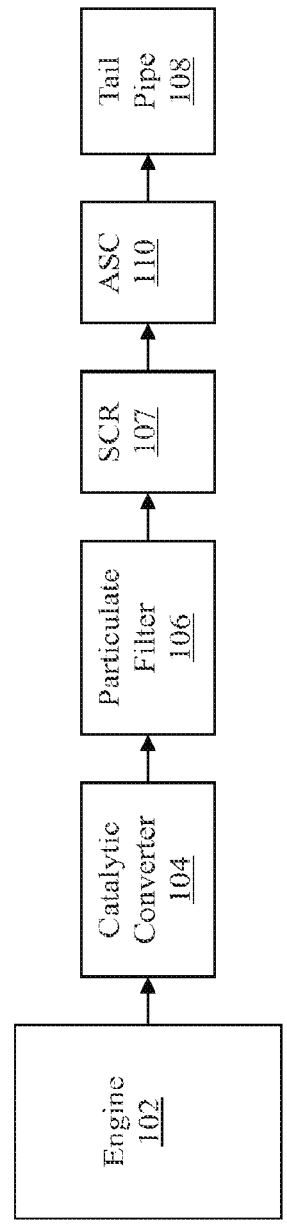

In the exhaust system of FIG. 1D, the exhaust stream passes from the engine 102 through a catalytic converter 104, a particulate filter 106, a selective catalytic reduction (SCR) unit 107 and an ammonia slip catalyst 110, before it is discharged into the atmosphere through a tail pipe 108. The catalytic converter 104 operates in the same manner as in the exhaust system of FIG. 1A. The particulate filter 106 traps particulate matter that is in the exhaust stream, e.g., soot, liquid hydrocarbons, generally particulates in liquid form. In an optional configuration, the particulate filter 106 includes a supported catalyst coated thereon for the oxidation of NO and/or to aid in combustion of particulate matter. The SCR unit 107 is provided to reduce the $NO_x$ species to N2. The SCR unit 107 may be ammonia/urea based or hydrocarbon based. The ammonia slip catalyst 110 is provided to reduce the amount of ammonia emissions through the tail pipe 108. An alternative configuration places the SCR unit 107 in front of the particulate filter 106.

Figure 1E:
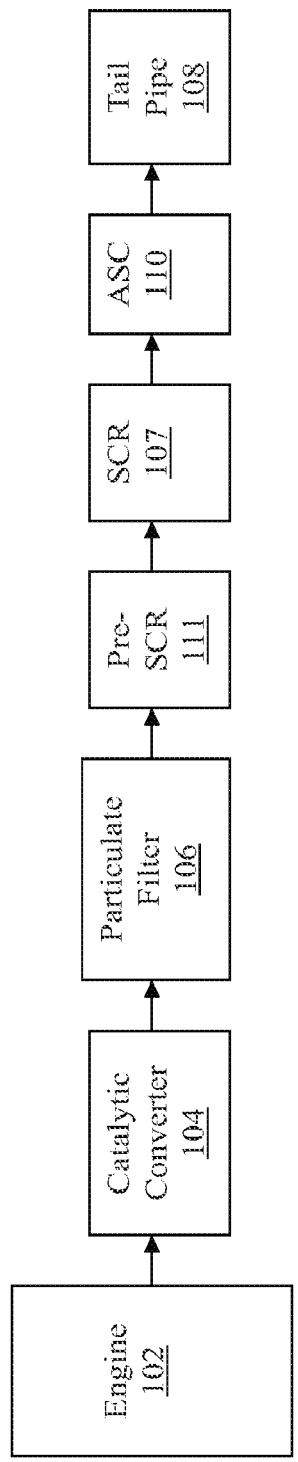

In the exhaust system of FIG. 1E, the exhaust stream passes from the engine 102 through a catalytic converter 104, a particulate filter 106, a selective catalytic reduction (SCR) unit 107 and an ammonia slip catalyst 110, before it is discharged into the atmosphere through a tail pipe 108. The catalytic converter 104 operates in the same manner as in the exhaust system of FIG. 1A. The particulate filter 106 traps particulate matter that is in the exhaust stream, e.g., soot, liquid hydrocarbons, generally particulates in liquid form. In an optional configuration, the particulate filter 106 includes a supported catalyst coated thereon for the oxidation of NO and/or to aid in combustion of particulate matter. The SCR unit 107 is provided to reduce the $NO_x$ species to N2. The SCR unit 107 may be ammonia/urea based or hydrocarbon based. The ammonia slip catalyst 110 is provided to reduce the amount of ammonia emissions through the tail pipe 108. A Pre-SCR unit 111 may be included in the system for the oxidation of NO to $NO_2$ and thereafter facilitates NOx reduction in the SCR unit 107. In an alternative configuration, the SCR unit 107 and/or the Pre-SCR 111 are placed upstream of the particulate filter 106.

Alternative configurations of the exhaust system includes the provision of SCR unit 107 and the ammonia slip catalyst 110 in the exhaust system of FIG. 1A or 1C, and the provision of just the SCR unit 107, without the ammonia slip catalyst 110, in the exhaust system of FIG. 1A, 1B or 1C. As a further alternative, a $NO_x$ storage reduction (NSR) catalyst may be used in place of the SCR unit 107.

As particulates get trapped in the particulate filter within the exhaust system of FIG. 1B, 1C, 1D, or 1E, it becomes less effective and regeneration of the particulate filter becomes necessary. The regeneration of the particulate filter can be either passive or active. Passive regeneration occurs automatically in the presence of $NO_2$. Thus, as the exhaust stream containing $NO_2$ passes through the particulate filter, passive regeneration occurs. During regeneration, the particulates get oxidized and $NO_2$ gets converted back to NO. In general, higher amounts of $NO_2$ improve the regeneration performance, and thus this process is commonly referred to as $NO_2$ assisted oxidation. However, too much $NO_2$ is not desirable because excess $NO_2$ is released into the atmosphere and $NO_2$ is considered to be a more harmful pollutant than NO. The $NO_2$ used for regeneration can be formed in the engine during combustion, from NO oxidation in the catalytic converter 104, from NO oxidation in the pre-filter catalyst 105, and/or from NO oxidation in a catalyzed version of the particulate filter 106.

Active regeneration is carried out by heating up the particulate filter 106 and oxidizing the particulates. At higher temperatures, $NO_2$ assistance of the particulate oxidation becomes less important. The heating of the particulate filter 106 may be carried out in various ways known in the art. One way is to employ a fuel burner which heats the particulate filter 106 to particulate combustion temperatures. Another way is to increase the temperature of the exhaust stream by modifying the engine output when the particulate filter load reaches a pre-determined level.

The present invention provides catalysts that are to be used in the catalytic converter 104 shown in FIGS. 1A-1E, or generally as catalysts in any vehicle emission control system, including as a diesel oxidation catalyst, a diesel filter catalyst, an ammonia-slip catalyst, an NSR catalyst, a SCR catalyst, a catalyst in the pre-SCR, or as a component of a three-way catalyst. The present invention further provides a vehicle emission control system, such as the ones shown in FIGS. 1A-1E, comprising an emission control catalyst having a monolith and a supported catalyst coated on the monolith.

Figure 2:
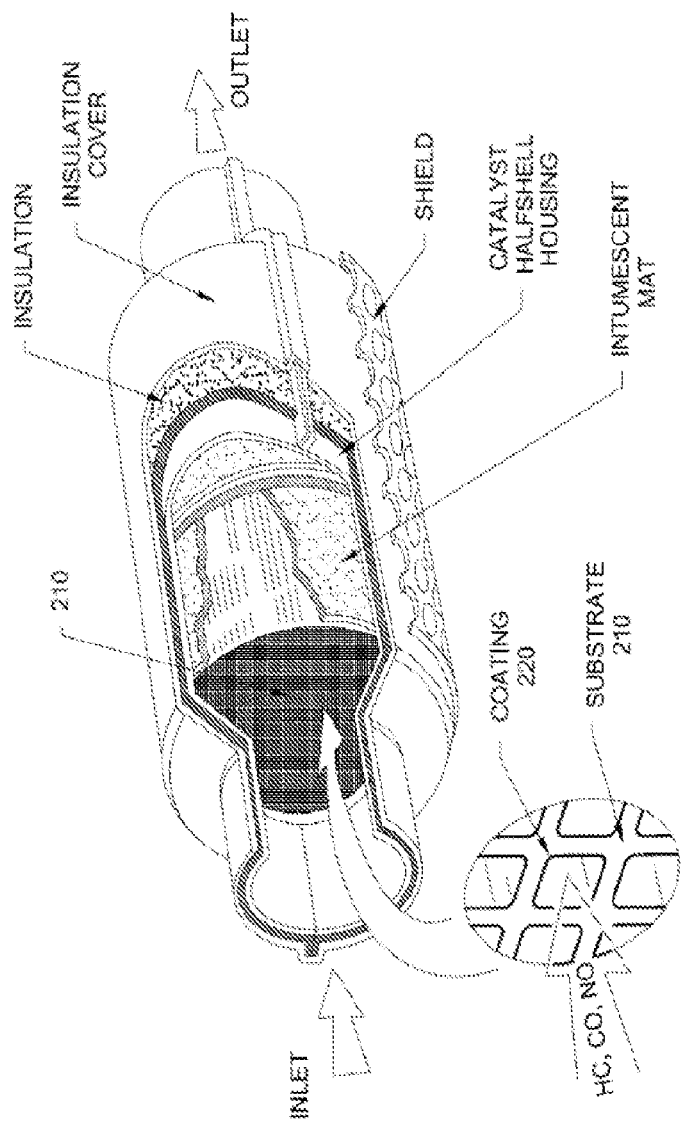
FIG. 2 is an illustration of a catalytic converter with a cut-away section that shows a substrate onto which emission control catalysts according to embodiments of the present invention are coated.

FIG. 2 is an illustration of a catalytic converter with a cut-away section that shows a substrate 210 onto which supported metal catalysts are coated. The exploded view of the substrate 210 shows that the substrate 210 has a honeycomb structure comprising a plurality of channels into which washcoats containing supported metal catalysts are flowed in slurry form so as to form coating 220 on the substrate 210.

In one embodiment of the present invention, a single layer of washcoat containing one or more supported metal catalysts is coated on substrate 210. FIGS. 3A-3D illustrate multi-layered, multi-zoned, and multi-brick embodiments of the present invention. In the embodiment of FIG. 3A, coating 220 comprises two washcoat layers 221, 223 on top of substrate 210. Washcoat layer 221 is the bottom layer that is disposed directly on top of the substrate 210. Washcoat layer 223 is the top layer that is in direct contact with the exhaust stream. Based on their positions relative to the exhaust stream, washcoat layer 223 encounters the exhaust stream before washcoat layer 221.

In the embodiment of FIG. 3B, coating 220 comprises three washcoat layers 221, 222, 223 on top of substrate 210. Washcoat layer 221 is the bottom layer that is disposed directly on top of the substrate 210. Washcoat layer 223 is the top layer that is in direct contact with the exhaust stream. Washcoat layer 222 is the middle layer that is disposed in between washcoat layers 221, 223. The middle layer is also referred to as a buffer layer. Based on their positions relative to the exhaust stream, washcoat layer 223 encounters the exhaust stream before washcoat layers 221, 222, and washcoat layer 222 encounters the exhaust stream before washcoat layer 221.

In the embodiment of FIG. 3C, the substrate 210 is a single monolith that has two coating zones 210A, 210B. A first washcoat is coated onto a first zone 210A and a second washcoat is coated onto a second zone 210B. In the embodiment of FIG. 3D, the substrate 210 includes first and second monoliths 231, 232, which are physically separate monoliths. A first washcoat is coated onto the first monolith 231 and a second washcoat is coated onto the second monolith 232.

Embodiments of the mixed phase catalyst disclosed herein may be used in the oxidation of nitrogen oxides, carbon monoxide, or hydrocarbons. The mixed phase catalyst may be included in a washcoat that is applied to one or more zones or layers of a multi-zoned or multi-layered system, such as the ones illustrated in FIGS. 3A-3D. In these embodiments, the washcoat containing the mixed phase catalyst may be coated onto a downstream zone or layer, e.g., downstream zone or monolith in a two-zone or two-brick system, the bottom layer in a two-layered system, or the middle layer or the bottom layer in a three-layered system. In other embodiments, the washcoat containing the mixed phase catalyst may be coated onto a upstream zone or layer, e.g., upstream zone or monolith in a two-zone or two-brick system, the top layer in a two-layered system, or the top layer or the middle layer in a three-layered system. In another embodiment, the mixed phase catalyst may be included in a single layer or single zone catalyst system. A platinum-based catalyst, palladium-based catalyst, or other suitable catalysts may optionally be included in one or more of the zones or layers, including the zone or layer containing the mixed phase catalyst. Also, zeolites may optionally be included in any one of the zones or layers as a hydrocarbon absorbing component. Exemplary zeolites include ZSM-5 zeolite, beta zeolite, Y zeolite, and combinations thereof.

In one embodiment, the mixed phase catalyst is a composite of a spinel phase oxide and one or more non-spinel phase oxides. For example, the spinel phase oxide may be mixed with a fluorite phase oxide. In another embodiment, the mixed phase catalyst may include a spinel phase oxide and at least two other phase oxides. For example, the mixed phase catalyst may include a spinel phase oxide, a fluorite phase oxide, and an orthorhombic or mullite phase oxide. In yet another embodiment, the mixed phase catalyst may include a mullite phase oxide and a different phase oxide such as a spinel phase oxide or a fluorite phase oxide. In another embodiment, the spinel phase oxide may include more than one type of metal.

A catalyst according to another embodiment has the general formula:

$$Ce_{1-x}A_{x+a}B_{y+b}M_{z-y}O_s \quad \text{(I)}$$

where:
- M is one or more metal elements selected from the group consisting of transition metals;
- A is one or more metal elements selected from the group consisting of transition metals, poor metals and the Lanthanide series, wherein A and M are different metals;
- B is one or more metal elements selected from the group consisting of alkali metals and alkaline earth metals;
- x is a number defined by $0<=x<=1$,
- a is a number defined by $a=>-1$,
- y and z are numbers defined by $0<=y<=z$,
- b is a number defined $b=>0$, and
- s is a number that renders the catalyst substantially charge neutral, In another embodiment, each of x, x+a, b, and z−y is a number greater than zero.

In one embodiment, M in Formula I may be an element selected from the group consisting of Ti, V, Cr, Mn, Fe, Co, Ni, Cu, Zn, and combinations thereof. In another embodiment, M is selected from the group consisting of V, Cr, Mn, Fe, Co, Ni, Cu and combinations thereof. In yet another embodiment, M is selected from the group consisting of Co, Mn, Cr, Fe, and combinations thereof.

In one embodiment, A in Formula I may be an element or a mixture of elements selected from the lanthanide series. In another embodiment, A is selected from the group consisting of Pr, Nd, Sm, Eu, Gd, Tb, Dy, Ho, Er, Tm, Yb Bi Zr, Sn, Y, La and combinations thereof.

In one embodiment, B in Formula I may be an element or a mixture of elements from the alkaline earth metals. In another embodiment, B is selected from the group consisting of Ba, Sr, Ca, Cs, Rb K, and combinations thereof. In yet another embodiment, B is selected from the group consisting of Sr, Ba, Ca, Mg, and combinations thereof.

In one embodiment, a mixed phase catalyst may have the general Formula I wherein M is selected from the group consisting of Co, Mn, Cr, Fe, and combinations thereof; A is selected from the group consisting of Pr, Nd, Sm, Eu, Gd, Tb, Dy, Ho, Er, Tm, Yb Bi Zr, Sn, Y, La and combinations thereof; and B is selected from the group consisting of Sr, Ba, Ca, Mg, and combinations thereof.

In another embodiment, a mixed phase catalyst has the general formula:

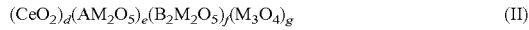

$$(CeO_2)_d(AM_2O_5)_e(B_2M_2O_5)_f(M_3O_4)_g \qquad (II)$$

where:
- d, e, f, g is a number greater than or equal to zero;
- A, B, and M have the same meaning as in formula (I) above;
- $CeO_2$ is a fluorite phase;
- $AM_2O_5$ and $B_2M_2O_5$ are mullite phases; and
- $M_3O_4$ is a spinel phase.

The transition metal M in the mullite phase may be selected from one or more of the transition metals. The dopants A and B in the mullite phase may be selected from the group consisting of alkali metals, alkaline earth metals, poor metals, transition metals, lanthanides, and their combinations.

In another embodiment, each of d, e, f, and g is a number greater than zero. In yet another embodiment, each of d, g, and at least one of e and f is a number greater than zero. In yet another embodiment, d may be a number defined by $0<d<=10$, for example, 0.2, 0.5, 1, 2, 3, 4, 5, 6, 7, 8, 9, 10. In yet another embodiment, e may be a number defined by $0<e<=10$, for example, 0.2, 0.5, 1, 2, 3, 4, 5, 6, 7, 8, 9, 10. In yet another embodiment, f may be a number defined by $0<f<=10$, for example, 0.2, 0.5, 1, 2, 3, 4, 5, 6, 7, 8, 9, 10. In yet another embodiment, g may be a number defined by $0<g<=10$, for example, 0.2, 0.5, 1, 2, 3, 4, 5, 6, 7, 8, 9, 10.

In another embodiment, the mullite phase in a mixed phase composite of Formula II may be selected any of the equivalent form of $A_2M_4O_9$, $A_2M_4O_{10}$, or $AM_2O_5$, where $A_2M_4O_9$ and $A_2M_4O_{10}$ are slight deviation from each other because the metal M can be in either $M^{3+}$ or $M^{4+}$ states. The ratio of M to A may be in a range from 5:1 to 1:5; preferably, from 3:1 to 1:1; more preferably, from 2.5:1 to 1.5:1. In another embodiment, the mullite phase maybe in the form of $B_2M_2O_5$. The metal M may be one or more metal elements selected from the group consisting of transition metals; preferably, M is selected from the group consisting of Ti, V, Cr, Mn, Fe, Co, Ni, Cu, Zn, and combinations thereof; more preferably, M is selected from the group consisting of V, Cr, Mn, Fe, Co, Ni, Cu and combinations thereof; and most preferably, M is selected from the group consisting of Co, Mn, Cr, Fe, and combinations thereof. The metal A may be one or more metal elements selected from the group consisting of transition metals, poor metals, and the Lanthanide series, wherein A and M are different metals; preferably, A is a metal or mixture of metals from the Lanthanide series; and more preferably, A is selected from the group consisting of Pr, Nd, Sm, Eu, Gd, Tb, Dy, Ho, Er, Tm, Yb Bi Zr, Sn, Y, La, and combinations thereof. The metal B is one or more metal elements selected from the group consisting of alkali metals and alkaline earth metals; preferably, B is an element or a mixture of elements from the alkaline earth metals; more preferably, B is selected from the group consisting of Ba, Sr, Ca, Cs, Rb K, and combinations thereof; and most preferably, B is selected from the group consisting of Sr, Ba, Ca, Mg, and combinations thereof. In one embodiment, M in Formula II is selected from the group consisting of Co, Mn, Cr, Fe, and combinations thereof; A is selected from the group consisting of Pr, Nd, Sm, Eu, Gd, Tb, Dy, Ho, Er, Tm, Yb Bi Zr, Sn, Y, La and combinations thereof; and B is selected from the group consisting of Sr, Ba, Ca, Mg, and combinations. In one embodiment, the mullite phase oxide may include manganese and one or more rare earth metals such as Sm and Sr. The mullite phase oxide may include a family of ceramics with known higher temperature stability and higher oxygen mobility characteristics. In this respect, the mixed phase catalyst may exhibit better stability of the catalyst particles in higher temperature environment than PGM materials based catalyst and may exhibit better oxidation catalyzing behavior due to better availability of bulk oxygen into the surface and interface regions.

In one embodiment, the spinel phase oxide is formed by a transition metal represented by the metallic element "M". Exemplary metallic element "M" includes Co, Mn, Ni, Cu, Fe, Cr, V, and combinations thereof, which can form either a spinel phase or a spinel phase with one or more oxide phase. The fluorite phase oxide is formed by the cerium oxide.

The mixed phase oxide catalyst may include dopants represented by the letters "A" and "B" in the general formulas (I) and (II). The dopants "A" and "B" may serve as dopants for the spinel phase oxide, the fluorite phase, the mullite phase, and/or another phase in the mixed phase catalyst. Exemplary elements of "B" include Ba, Sr, Ca, Cs, Rb K, and combinations thereof. Exemplary elements of "A" include Pr, Nd, Sm, Eu, Gd, Tb, Dy, Ho, Er, Tm, Yb Bi Zr, Sn, Y, La and combinations thereof. The dopants may include a mixture of the elements selected from the respective groups. For example, the dopant "B" may be a mixture of Ba and Sr, and the dopant "A" may be a mixture of Sm and Nd. Portions of the same dopant may modify more than one oxide phase in the catalyst. For example, barium may be used to dope the spinel phase oxide, the mullite phase, and the fluorite phase oxide. In another example, both dopants "A" and "B" may modify the same phase, such as modifying the spinel phase or the mullite phase. Exemplary embodiments of the mixed phase oxide include oxides of CeCo alone or with dopants such as Ba, Sr, and Sm, Cs, and combinations thereof. Another exemplary embodiment includes the oxides of CeMn alone or with dopants such as Sr, Sm, Ba, and combinations thereof. Yet another exemplary embodiment includes the oxides of Mn with dopants such as Sr, Sm, Ba, and combinations thereof. Additional embodiments of mixed phase oxides include oxides of CeCoBa, CeCoSr, CeCoBaSm, CeMnSrSm, MnSrSm.

In one embodiment, the mixed phase catalyst does not include a precious metal such as platinum or palladium. In this respect, the mixed phase catalyst may provide a lower cost alternative to precious metal oxidation catalysts. It is expected the non-precious metal mixed phase catalyst disclosed herein will exhibit a similar level of oxidation performance. In one embodiment, a mixed phase catalyst may include a multi-phase oxide wherein different phases are mixed together. The mixture of the different phases may be at the macroscopic or microscopic scale. The mixed phases may even extend to single particle. For example, multiple crystallite and amorphous phases may be identified within one particle.

In another embodiment, the mixed phase catalyst may include a composite having two or more constituent materials with different physical or chemical properties which remain separate and distinct at the macroscopic or microscopic scale within the finished structure. For example, two particles with different compositions remain separate in TEM ("Transmission Electron Microscopy") while they do have common interface.

The mixed phase catalyst may be synthesized using any suitable process. An exemplary synthesis method is co-precipitation method. In general, the co-precipitation method includes dissolving suitable amounts of the different metal salt precursors such as nitrates or acetates in water. Optional polymer surfactants such as Poly Vinyl Alcohol ("PVA"); Triton X-100 ($C_{14}H_{22}O(C_2H_4O)_n$), which is commercially available from Dow Chemical Company; Pluronic F127, a non-ionic, difunctional copolymer block copolymer surfactant terminating in primary hydroxyl groups or the sodium salt of Polyacrylic Acid ("Na-PAA") may be added to the solution. Tetramethylammonium hydroxide ("TMAOH") may be added to increase the pH of the solution to a pH between about 9 and 12. The metal cations are then precipitated using a precipitating agent such as sodium hydroxide, sodium carbonate, oxalic acid, sodium oxalate or ammonium oxalate. The metal cations may optionally be oxidized using hydrogen peroxide. Additional TMAOH is added to reestablish the pH of the solution. The resulting metal precipitant is filtered and washed using deionized water 3 or 4 times. Finally, the metal precipitant is dried, processed, and calcined at 500° C. for 2 hours.

Alternatively, the mixed phase catalyst may be synthesized using the citric acid method. In general, the method includes dissolving suitable amounts of the different metal salts in water with 10% excess of molar amounts of citric acid. Optionally, all or a portion of the citric acid may be substituted with EDTA or a mixture of PVA and sucrose. The mixture is stirred and heated until a viscous gel forms. The viscous gel is dried, processed, and calcined at 500° C. for 2 hours.

In another embodiment, the mixed phase catalyst may be supported on a refractory supports such as $Al_2O_3$, $SiO_2$, $TiO_2$, $ZrO_2$, $CeO_2$, $Ce_xZr_{1-x}O_2$, MgO, and combinations thereof. These supported mixed phase catalysts may be synthesized using deposition-precipitation method. Mixtures of the metal precursors can be added to the slurry containing refractory supports or reversely adding the support slurry to precursor mixture. TMAOH can be used for pH adjustment. Hydrogen peroxide may be added if metal cations need to be oxidized before precipitation. The refractory supports may facilitate coating of the catalyst and may further reduce manufacturing costs.

Several samples of the mixed phase catalyst were prepared for testing. In general, the mixed phase catalysts of Samples 1-8 were prepared in the following manner:

Sample 1: Dissolve 8.4969 g of $Co(NO_3)_2 \cdot 6H_2O$, 0.2543 g of $Ba(NO_3)_2$, 3.8030 g of $Ce(NO_3)_3 \cdot 6H_2O$, and 0.2418 g of polyvinyl alcohol (PVA) (80% hydrolyzed) in warm (80° C.) $H_2O$. Add 28 mL of 25% TMAOH to until the pH reaches 12. Dissolve 0.1239 g of oxalic acid in ~2 mL warm water (80° C.) in a separate container, and then add to the metal hydroxide suspension. Add 2 mL of TMAOH to reach pH 10.8. Slowly add (drop wise) 4.265 mL of 30% $H_2O_{2(aq)}$ along with 0.3 mL of TMAOH to bring the pH to 10.8. Filter and dry the precipitate overnight at 120° C. Process and dry the filter cake using mortar and pestle and calcine for 2 hours at 500° C. The process yielded ~4 g of $Ce_{0.9}Ba_{0.1}Co_3O_{5.9}$.

Sample 2: The procedure was similar to Sample 1, but with the following changes. Dissolve 256.1 g of $Co(NO_3)_2 \cdot 6H_2O$, 15.3 g of $Ba(NO_3)_2$, and 101.9 g of $Ce(NO_3)_3 \cdot 6H_2O$ in water. Add 840 mL of TMAOH, then 7.4689 g of oxalic acid. Add 126 mL of $H_2O_2$, then add 55 mL of TMAOH until the pH reaches 10.2. The process yielded ~120 g of $Ce_{0.8}Ba_{0.2}Co_3O_{5.8}$.

Sample 3: Dissolve 4.2064 g of $Ce(NO_3)_3 \cdot 6H_2O$ and 8.4579 g of $Co(NO_3)_2 \cdot 6H_2O$ in approximately 30 mL $H_2O$. Add 28 mL of 25% tetramethylammonium hydroxide ($TMAOH_{(aq)}$) until the pH reaches 10 and let stir for 2 hours. Filter and dry the precipitate overnight at 120° C. Process the dry filter cake using mortar and pestle and calcine for 2 hours at 500° C. The process yielded ~4 g of $CeCo_3O_6$.

Sample 4: The procedure was similar to Sample 1, but with the following changes. Dissolve 8.0527 g of $Co(NO_3)_2 \cdot 6H_2O$, 0.8366 g of $Sr(NO_3)_2$, 1.7164 g of $Ce(NO_3)_3 \cdot 6H_2O$, 1.7569 g of $Sm(NO_3)_3 \cdot 6H_2O$ and 0.2985 g of PVA in water. Add 30 mL of TMAOH, then 0.5482 g of oxalic acid. Finally, add 2.45 mL of $H_2O_2$. The process yielded ~4 g of $CeCo_7Sr_1Sm_1O_{13.8}$.

Sample 5: The procedure was similar to Sample 1, but with the following changes. Dissolve 7.6756 g of $Co(NO_3)_2 \cdot 6H_2O$, 0.9847 g of $Ba(NO_3)_2$, 1.6360 g of $Ce(NO_3)_3 \cdot 6H_2O$, 1.6746 g of $Sm(NO_3)_3 \cdot 6H_2O$ and 0.2608 g of PVA in water. Add 25 mL of TMAOH, then 0.5225 g of oxalic acid. Add 2.335 mL of $H_2O_2$, then add 3 mL of TMAOH until the pH reaches 10.4. The process yielded ~4 g of $CeCo_7Ba_1Sm_1O_{13.8}$.

Sample 6: The procedure was similar to Sample 1, but with the following changes. Dissolve 7.7914 g of $Mn(CH3CO_2)_2 \cdot 4H_2O$, 0.4205 g of $Sr(NO_3)_2$, 1.7255 g of $Ce(NO_3)_3 \cdot 6H_2O$, 0.8831 g of $Sm(NO_3)_3 \cdot 6H_2O$ and 0.2751 g of PVA in water. Add 15 mL of TMAOH, then 0.2755 g of oxalic acid. Add 3.9 mL of $H_2O_2$, then add 11 mL of TMAOH until the pH reaches 9.2. The process yielded ~4 g of $CeMn_8Sr_{0.5}Sm_{0.5}O_{19.2}$.

Sample 7: The procedure was similar to Sample 1, but with the following changes. Dissolve 6.4823 g of $Mn(CH3CO_2)_2 \cdot 4H_2O$, 0.7996 g of $Sr(NO_3)_2$, 1.6406 g of Ce(NO$_3$)$_3$.6H$_2$O, 1.6794 g of Sm(NO$_3$)$_3$.6H$_2$O and 0.2853 g of PVA in water. Add 25 mL of TMAOH, then 0.5240 g of oxalic acid. Add 3.705 mL of H$_2$O$_2$, then add 1 mL of TMAOH until the pH reaches 8.9. The process yielded ~4 g of CeMn$_7$Sr$_1$Sm$_1$O$_{18.5}$.

Sample 8: The procedure was similar to Sample 1, but with the following changes. Dissolve 16.2058 g of Mn(CH3CO$_2$)$_2$.4H$_2$O, 1.9990 g of Sr(NO$_3$)$_2$, 4.1016 g of Ce(NO$_3$)$_3$.6H$_2$O, 4.1984 g of Sm(NO$_3$)$_3$.6H$_2$O and 3.16 mL of Triton X-100 in water. Add 45 mL of TMAOH, then 1.3099 g of oxalic acid. Add 9.3 mL of H$_2$O$_2$, and then add 20 mL of TMAOH until the pH reaches 9.0. The process yielded ~10 g of CeMn$_7$Sr$_1$Sm$_1$O$_{18.5}$.

Sample 9: The procedure was similar to Sample 1, but with the following changes. Dissolve 505.8 g of Mn(CH3CO$_2$)$_2$.4H$_2$O, 62.4 g of Sr(NO$_3$)$_2$, 128.0 g of Ce(NO$_3$)$_3$.6H$_2$O, 53.4 g of Gd$_2$O$_3$ in water. Mix separately 111.7 g Pluronic F127 and 116.6 g Polyethylene Glycol (PEG) and 2.1 L of 25 wt % TMAOH. Add the metal precursors in the base mixture and then add 40.9 g of oxalic acid followed by 193.9 mL of H2O2. Add additional 75 mL of TMAOH to keep pH at 9.0 The process yielded ~300 g of CeMn$_7$Sr$_1$Gd$_1$O$_{18.5}$.

Samples 2, 5, and 8 were for selected for X-ray diffraction ("XRD") testing to determine the phase composition of the catalyst. The XRD result of sample 2 revealed that the catalyst contained mixed phases of spinel phase and fluorite phase. Specifically, the results indicated the spinel phase was formed by a cobalt oxide, and the fluorite phase was formed by a cerium oxide. FIG. 4 shows the XRD results of sample 2.

The XRD result of sample 5 revealed that the catalyst contained the mixed phases of spinel, perovskite, cubic, and fluorite phases. Specifically, the results indicated the spinel phase was formed by a cobalt oxide, the perovskite phases are formed by BaCo$_{0.998}$O$_{2.782}$ and SmCoO$_3$, the cubic phases are comprised of Sm$_2$O$_3$ and BaO, and the fluorite phase was formed by a cerium oxide and samarium cerium oxide. FIG. 5 shows the XRD results of sample 5.

The XRD result of sample 8 revealed that the catalyst contained mixed phases of spinel phase, fluorite phase, and orthorhombic phase. Specifically, the results indicated the spinel phase was formed by a manganese oxide, the fluorite phase was formed by a cerium oxide, and the orthorhombic phase was formed by a samarium manganese oxide. FIG. 6 shows the XRD results of sample 8.

A comparative study was carried out to observe the performance of the mixed phase catalysts. The performance of the mixed phase catalyst was compared to several types of catalysts ("C#"). All of the comparative catalysts are single phase catalysts. All of the catalysts in the Table are metal oxides, except for comparative sample 1 (C1), which is a 2% platinum catalyst on alumina. The testing conditions included mixing 10 mg of the sample catalyst with 90 mg of 100 mesh α-alumina and packing the mixture with quartz wool into a flow-through glass U-tube. The catalyst is exposed to a gas mixture of 450 ppm NO, 10% O$_2$, and the remaining balance He, flowing at a rate of 200 sccm, in a furnace ramping to 350° C. at 10° C./min. In preparation of aged testing, the catalysts were hydrothermally aged for 10 hrs at 820° C. with 10% water. Table 1 below shows the performance of fresh catalysts and aged catalysts. It should be noted that the fresh state for samples 1-6 means thermal treatment in static air for 2 hrs at 500° C., which is typical pretreatment condition for precious metal containing catalysts. However, the fresh state for samples 7-9 means thermal treatment at 500° C. for 8 hrs followed by 800° C. for 8 hrs.

TABLE 1

| | | | NOx Performance of Fresh Catalyst | | Aged Performance 10 hr., 820° C., 10% H2O | |
|---|---|---|---|---|---|---|
| Sample | Metals | Ratio | % Conversion @ 250° C. | Peak % @ T = 340-350° C. | % Conversion @ 250° C. | Peak % @ T = 340-350° C. |
| C1 | 2% Pt | | | | 32 | 62 |
| C2 | Co | 3 | 1 | 46 | 1 | 42 |
| C3 | Mn | 4 | 18 | 74 | 5 | 40 |
| C4 | LaSrCo | .9/.1/1 | 6 | 57 | 5 | 61 |
| C5 | BaCo | 3/4 | 8 | 80 | 2 | 64 |
| 1 | CeBaCo | .9/.1/3 | 14 | 85 | 9 | 70 |
| 2 | CeBaCo | .8/.2/3 | 6 | 83 | 7 | 78 |
| 3 | CeCo | 1/3 | 5 | 83 | 0 | 41 |
| 4 | CeCoSrSm | 1/7/1/1 | 9 | 77 | 5 | 71 |
| 5 | CeCoBaSm | 1/7/1/1 | 12 | 82 | 6 | 78 |
| 6 | CeMnSrSm | 1/8/.5/.5 | 21 | 77 | 10 | 72 |
| 7 | CeMnSrSm | 1/7/1/1 | 16* | 77* | 20 | 79 |
| 8 | CeMnSrSm (Triton) | 1/7/1/1 | 22* | 81* | 30 | 86 |
| 9 | CeMnSrGd | 1/7/1/1 | 30* | 83* | 34 | 83 |

*indicates catalyst has been calcined at 500° C. 8 hrs followed by 800° C. 8 hrs in static air as fresh state for sample numbers 7-9.

Table 1 shows the percentage (%) conversion of NO at 250° C. and the maximum peak % conversion at the measured temperature for the fresh catalyst and the aged catalyst. For example, sample 2 converted 6% NO at 250° C. and had a maximum conversion of 83% NO at the peak temperature between of about 340° C. to 350° C. during fresh performance, and converted 7% NO at 250° C. and had a maximum conversion of 78% NO at the peak temperature between of about 340° C. to 350° C. during aged performance.

As shown in Table 1, the data indicate the doped mixed phase catalysts possess good aged resistance, as illustrated by the small decrease at peak conversion of the aged performance compared to the fresh performance. Samples 7-9 actually achieved better aged performance. However, sample 3, which was not doped, did not perform as well when aged. In comparison to the platinum catalyst, most of the aged samples did not match the performance of the aged platinum catalyst at low temperature, i.e., 250° C., while samples 7 to 9 performed at a similar level as the platinum catalyst. Notably, at high temperature, all of the mixed phase catalyst samples, except for sample 3, exhibited better conversion than the platinum catalyst. Thus, the mixed oxide catalysts were shown to be sufficiently effective for oxidizing NO while possessing a lower cost advantage over platinum. The data also reveal that doped, mixed phase samples performed better than the single phase comparative samples at high temperature, either fresh or aged.

With respect to doping, the data for comparative sample C5 suggests that doping of comparative sample C1 with barium increases the performance of the catalyst, both when fresh and aged. The data for sample 3 shows adding cerium to cobalt to form a mixed phase catalyst only increases the fresh performance, not the aged performance. According to these two data samples, a person of ordinary skill would not have expected adding cerium oxide to sample C5 would increase the aged performance. However, the data for samples 1 and 2 unexpectedly show this result; that is, doped, mixed phase catalysts do have a higher aged performance than a doped, single phase catalyst (sample C5) or an undoped, mixed phase catalyst (sample 3). The data further suggests that using Triton X as the surfactant instead of PVA during synthesis increases the aged performance of the catalyst at both low and high temperatures. Indeed, sample 8 performed as well as the platinum catalyst low temperature, and performed better than the platinum catalyst at high temperature.

Embodiments of the mixed phase catalyst may also be used to convert carbon monoxide and hydrocarbons such as propane. Tables 2 and 3 below show the performance of samples 2, 3, and 7.

TABLE II

Carbon Monoxide

| Sample | Metals | Ratio | Fresh Performance | | Aged Performance | |
|---|---|---|---|---|---|---|
| | | | T ° C. @ 20% Conversion | T ° C. @ Peak % | T ° C. @ 20% Conversion | T ° C. @ Peak % |
| 2 | CeBaCo | .8/.2/3 | 127° C. | 175° C. | 173° C. | 245° C. |
| 3 | CeCo | 1/3 | 160° C. | 210° C. | 182° C. | 238° C. |
| 7 | CeMnSrSm | 1/7/1/1 | n/a | n/a | 222° C. | 80% @ 250° C. |

Table II shows the ability of the sample 2, 3, and 7 to convert carbon monoxide. In the table, peak conversion is 100% unless otherwise indicated. The data reveals that aged catalysts of samples 2 and 3 required a higher temperature to convert carbon monoxide than fresh catalyst. Also, sample 2 was less age resistant than sample 3. The data also show catalyst containing manganese oxide does not perform as well as catalysts containing cobalt oxide.

TABLE III

Propane

| Sample | Metals | Ratio | Fresh Performance | | Aged Performance | |
|---|---|---|---|---|---|---|
| | | | T ° C. @ 20% Conversion | T ° C. @ Peak % | T ° C. @ 20% Conversion | T ° C. @ Peak % |
| 2 | CeBaCo | .8/.2/3 | 216° C. | 263° C. | 256° C. | 65% @ 300° C. |
| 3 | CeCo | 1/3 | 221° C. | 275° C. | 245° C. | 92% @ 300° C. |
| 7 | CeMnSrSm | 1/7/1/1 | n/a | n/a | 227° C. | 95% @ 300° C. |

Table III shows the ability of the sample 2, 3, and 7 to convert propane. In the table, peak conversion is 100% unless otherwise indicated. The data reveals that aged catalysts of samples 2 and 3 required a higher temperature to convert the propane than fresh catalyst. In addition, the data show catalyst containing manganese oxide does not perform as well as catalysts containing cobalt oxide.

Embodiments of the mixed phase catalysts may be used as an emission control catalyst. The mixed phase catalysts may be referred to as a non-precious group metal ("NPGM") catalyst when it does not contain a precious group metal. Exemplary precious group metals include platinum, palladium, gold, and rhodium.

As described above, the mixed phase catalyst may be included in one or more layers or zones of a multi-layered or multi-zoned emission control catalyst, such as the ones illustrated in FIGS. 3A-3D. For example, in a two layer system, the mixed phase catalyst may be disposed in the top layer, bottom layer, or both. Similarly, in a two zone system, the mixed phase catalyst may be disposed in the front zone, back zone, or both. In another embodiment, the mixed phase catalyst may be included in a single layer or single zone emission control catalyst. In yet another embodiment, the mixed phase catalyst may be included in one or more layers or zones of a three multiple layer or zone emission control catalyst. In one embodiment, the NPGM catalyst loading may be in a range from about 0.2 g/in$^3$ to about 5 g/in$^3$; preferably, from about 0.5 g/in$^3$ to about 3 g/in$^3$; and more preferably, from about 0.7 g/in$^3$ to about 1 g/in$^3$. For sake of clarity, the emission control catalyst will be described with respect to a layered system; however, it must be noted that the descriptions are equally applicable to a zoned system.

A precious group metal ("PGM") catalyst or other suitable catalysts may be included in one or more layers of the emission control catalyst, including the layer containing the mixed phase catalyst. An exemplary PGM catalyst is a platinum-based catalyst such as a platinum catalyst, a platinum-palladium catalyst, a platinum catalyst promoted with bismuth or other now promoters, or other platinum-based catalysts (e.g., Pt—Rh, Pt—Ir, Pt—Ru, Pt—Au, Pt—Ag, Pt—Rh—Ir, Pt—Ir—Au, etc.). The weight ratio of platinum to palladium in the platinum-palladium catalyst is about 0.05:1 to 20:1, preferably from about 0.5:1 to about 4:1. Another exemplary PGM catalyst is a palladium-based catalyst such as a palladium catalyst, a palladium-gold catalyst, and other suitable palladium containing catalysts. The weight ratio of palladium to gold in the palladium-gold catalyst is about 0.05:1 to 20:1, preferably from about 0.5:1 to about 2:1. The palladium-gold catalyst may be promoted with bismuth or other known promoters. In one embodiment, a plurality of different types of PGM catalysts may be included in one or more layers of the emission control catalyst. Additionally, any one of the plurality of PGM catalysts may be included in one or more layers. For example, in a two layer system, a platinum-palladium may be included in the top layer, bottom layer, or both layers. An optional second PGM catalyst, such as a palladium based catalyst may be included in the top layer, bottom layer, or both. In a single layer example, the single layer may include a platinum-based catalyst such as a platinum-palladium catalyst and optionally, a palladium-based catalyst. In one embodiment, the PGM catalyst loading may be in a range from about 5 g/ft$^3$ to about 180 g/ft$^3$; preferably, from about 20 g/ft$^3$ to about 125 g/ft$^3$; and more preferably, from about 50 g/ft$^3$ to about 100 g/ft$^3$.

In additional embodiments, a hydrocarbon absorbing material may be included in one or more of the layers the emission control catalyst, including the layer containing the mixed phase catalyst. In the configuration shown in FIG. 3A, the hydrocarbon absorbing material may be included in the top layer 223, the bottom layer 221, or both. In the configuration shown in FIG. 3C, the hydrocarbon absorbing material may be included in the first zone 210A, the second zone 210B, or both. In the configuration shown in FIG. 3D, the hydrocarbon absorbing material may be included in the front monolith 231, the back monolith 232, or both. In the examples provided below, a hydrocarbon absorbing material is zeolite. Exemplary zeolites include a beta zeolite, ZSM-5 zeolite, Y zeolite, and combinations thereof, with or without other types of zeolites, in any weight ratio. In another embodiment, the emission control catalyst may include a binder such as boehmite.

In one embodiment, the emission control catalyst includes a bottom layer containing a mixed phase catalyst and a platinum-based catalyst such as platinum-palladium, and a top layer containing a zeolite and optionally, a palladium-based catalyst. In another embodiment, the emission control catalyst includes a bottom layer containing a platinum-based catalyst such as platinum-palladium and a zeolite, and a top layer containing a mixed phase catalyst. In yet another embodiment, the emission control catalyst includes a single layer containing a mixed phase catalyst, a platinum-based catalyst such as platinum-palladium, a zeolite, and optionally, palladium-based catalyst.

Figure 7:
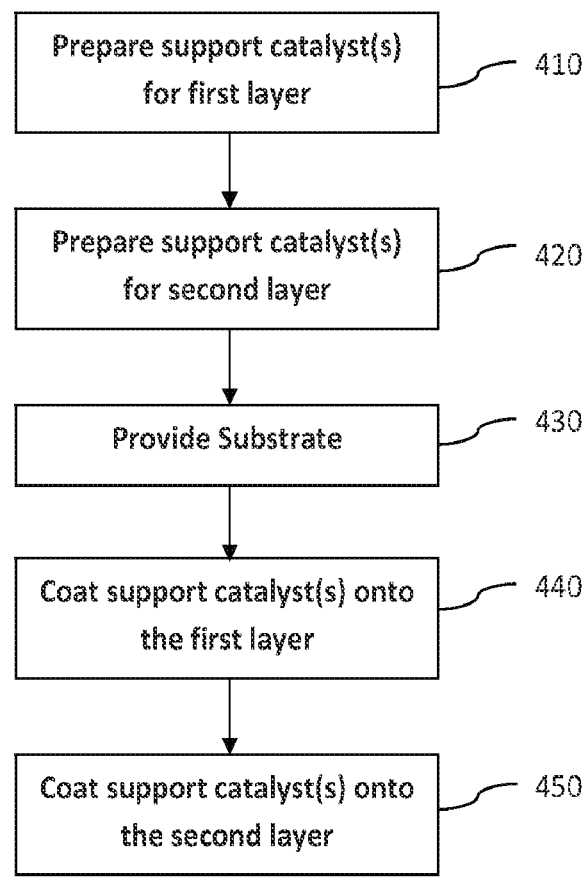
FIG. 7 is a flow diagram illustrating the steps for preparing an emission control catalyst according to an embodiment of the present invention.

FIG. 7 is a flow diagram that illustrates the steps for preparing an emission control catalyst according to another embodiment of the present invention using the substrate 210. In step 410, a supported catalyst, e.g., supported NPGM catalyst, for the first layer is prepared accordance with known methods or with the methods described in herein. The first layer may include an optional second supported catalyst such a platinum-based catalyst, which can be separately prepared in this step. In step 420, a supported catalyst, e.g., supported palladium-based catalyst, for the second layer is prepared in accordance with known methods or with the methods described herein. A monolithic substrate, such as substrate 210 shown in FIG. 2, is provided in step 430. Exemplary monolithic substrates include those that are ceramic (e.g., cordierite), metallic, or silicon carbide based. In step 440, the supported catalyst, e.g., NPGM catalyst and the platinum-based catalyst, for the first layer are provided in powder form and mixed in a solvent to form a washcoat slurry. This washcoat slurry is coated as the bottom layer 221 of the substrate 210. In step 450, zeolite or zeolite mixture and the supported catalyst, e.g., palladium-based catalyst, for the second layer are added to a solvent to form a washcoat slurry. This washcoat slurry is coated as the top layer 223 of the substrate 210.

Sample 10—Dual-layer: PtPd and NPGM in the bottom layer, zeolite in the top layer.

(a) Preparation of NPGM Catalyst

The NPGM catalyst used in Sample 10 is prepared in accordance with Sample 8 above.

(b) Preparation of a 2.4% Pt, 1.6% Pd Supported Catalyst

To 10 L of de-ionized $H_2O$ was added 2000 g of gamma-alumina (having a BET surface area of ~150 $m^2$ $g^{-1}$, Sasol Puralox TH 100/150 in this particular sample) followed by stirring for 30 minutes at room temperature. To this slurry was added 392.52 g of $Pt(NO_3)_2$ solution (12.23% $Pt(NO_3)_2$ by weight), followed by stirring at room temperature for 60 minutes. Acrylic acid (400 mL, 99% purity) was then added into the system over 12 minutes and the resulting mixture was allowed to continue stirring at room temperature for 2 hours. The solid alumina supported Pt catalyst was separated from the liquid via filtration, dried at 120° C. for 2 hours, ground into a fine powder, and calcined in air for 2 hours at a temperature of 500° C. (heated at 8° C. $min^{-1}$) to give a 3% Pt material.

To 9.5 L of de-ionized $H_2O$ was added 1900 g of the above 3% Pt material followed by stirring for 20 minutes at room temperature. To this slurry was added 216.5 g of $Pd(NO_3)_2$ solution (14.28% $Pd(NO_3)_2$ by weight), followed by stirring at room temperature for 60 minutes. An aqueous ascorbic acid solution (517.8 g in 2.8 L of de-ionized $H_2O$) was then added over 25 minutes followed by stirring for 60 minutes. The solid alumina supported PtPd catalyst was separated from the liquid via filtration, dried at 120° C. for 2 hours, ground into a fine powder, and calcined in air for 2 hours at a temperature of 500° C. (heated at 8° C. $min^{-1}$) to give a 3% Pt, 2% Pd material.

(c) Coating of Bottom Layer

The NPGM catalyst and the supported PtPd catalyst powder (2.4% Pt, 1.6% Pd) prepared as described above were mixed with de-ionized water and milled before being made into a washcoat slurry. The appropriate particle size after milling is typically with a $d_{50}$ range from 3 to 7 µm. The pH of the washcoat slurry is then adjusted to give an appropriate viscosity for washcoating. According to methods known in the art, the washcoat slurry was coated onto a round cordierite monolith (Corning, 400 cpsi, 5.66 inches× 2.5 inches), dried at 90° C. followed by 120° C. and calcined at 500° C. to give the first layer of the multi-layer coated monolith, such that the NPGM loading was approximately 1 $g/in^3$ and the PtPd loading was approximately 60 $g/ft^3$.

(d) Coating of Top Layer

According to methods known in the art, a washcoat slurry including zeolite was formed and coated onto the cordierite monolith (covered with the first layer of slurry), dried at 90° C. followed by 120° C., and calcined at 500° C. to give the second layer of the multi-layer coated monolith such that the zeolite mixture comprises about 0.2 $g/in^3$ of the total washcoat loading.

The multi-layer coated monolith was canned according to methods known in the art and tested using a certified testing facility on a light-duty diesel vehicle, as described above.

Sample 11—Dual-layer: PtPd and zeolite in the bottom layer, NPGM in the top layer.

(a) Preparation of NPGM Catalyst

The NPGM catalyst used in Sample 11 is the catalyst of Sample 8 above.

(b) Preparation of a 2.4% Pt, 1.6% Pd Supported Catalyst

The PtPd catalyst is prepared as described in Sample 10.

(c) Coating of Bottom Layer

The supported PtPd catalyst powder (2.4% Pt, 1.6% Pd) was made into a washcoat slurry via addition to de-ionized water, then milled to an appropriate particle size (typically with a $d_{50}$ range from 3 to 7 µm); and pH adjusted to give an appropriate viscosity for washcoating. The zeolites were thereafter mixed into the washcoat slurry. According to methods known in the art, the washcoat slurry was coated onto a round cordierite monolith (Corning, 400 cpsi, 5.66 inches×2.5 inches), dried at 90° C. followed by 120° C., and calcined at 500° C. to give the first layer of the multi-layer coated monolith, such that the PtPd loading was approximately 60 $g/ft^3$ and the zeolite mixture comprises about 0.3 $g/in^3$ of the total washcoat loading.

(d) Coating of Top Layer

The NPGM catalyst was made into a washcoat slurry via addition to de-ionized water, then milled to an appropriate particle size (typically with a $d_{50}$ range from 3 to 7 µm); and pH adjusted to give an appropriate viscosity for washcoating. According to methods known in the art, this washcoat slurry was coated onto a round cordierite monolith (covered with the first layer of slurry), dried at 90° C. followed by 120° C., and calcined at 500° C. to give the second layer of the multi-layer coated monolith, such that the NPGM loading was approximately 1 $g/in^3$.

Sample 12 is a dual layer catalyst having zeolite in the bottom layer, and PtPd and NPGM in the top layer.

Sample 13 is a dual-layer catalyst having PtPd in the bottom layer, and NPGM and zeolite in the top layer.

Sample 14 is a dual-layer catalyst having PtPd and NPGM in the bottom layer, and Pd and zeolite in the top layer.

Sample 15 is a single layer catalyst having PtPd, NPGM, and zeolite in the same layer.

Sample 16 is a tri-layer catalyst having PtPd in the bottom layer, zeolite in the middle layer, and NPGM in the top layer.

Samples 12-16 were made using the preparation steps according to sample 10. In particular, the NPGM catalysts were prepared using the method described in sample 8, and the PtPd catalysts were prepared using the method described in sample 10. Coating of the layers followed the procedure described in sample 10. Total loadings of the PtPd and NPGM were 60 g/ft$^3$ and 1 g/in$^3$, respectively.

The multi-layer coated monolith was canned according to methods known in the art and tested using a certified testing facility on a light-duty diesel vehicle, as described above.

Figure 8:
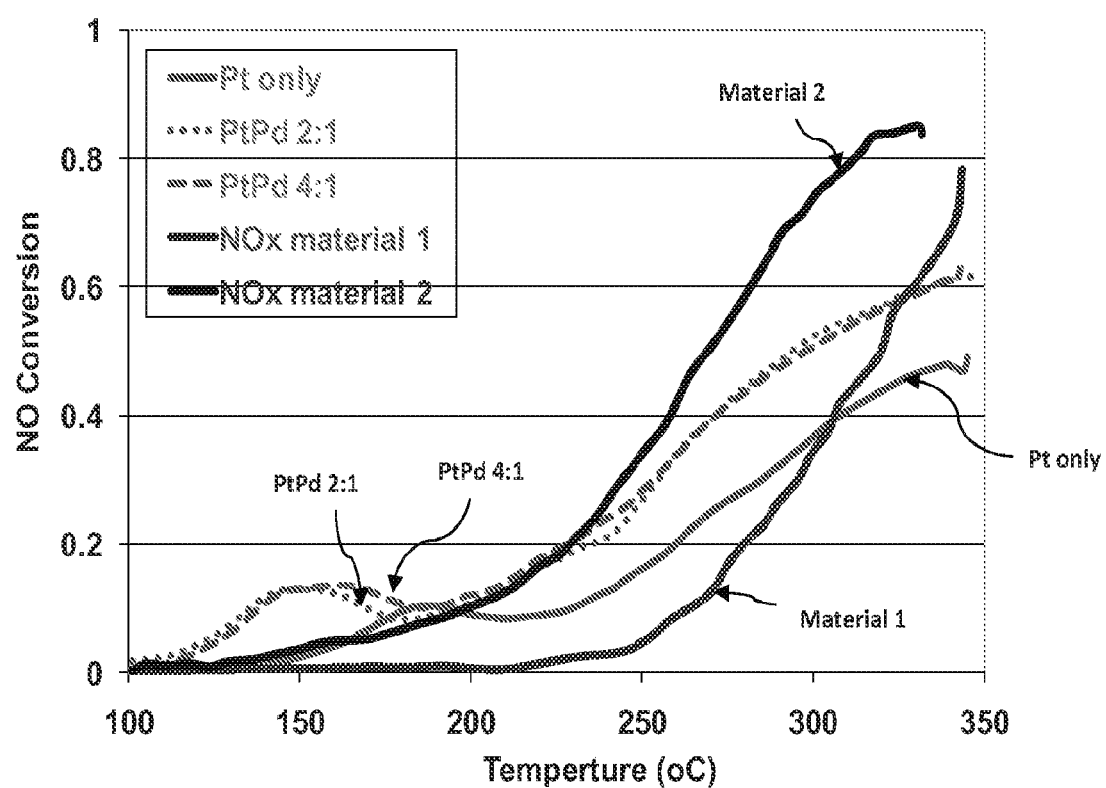
FIG. 8 illustrates the results of NO conversion testing of an emission control catalyst according to an embodiment of the present invention and other catalysts.

FIG. 8 illustrates the results of NO conversion testing of the emission control catalyst of Sample 8 (referenced as "No$_x$ material 2"), a platinum catalyst, a platinum-palladium catalyst having a weight ratio of 2% Pt:1% Pd, a platinum-palladium catalyst having a weight ratio of 4% Pt:1% Pd, and a cobalt-based catalyst (referenced as "No$_x$ material 1"). The testing conditions for NO oxidation include exposing the catalyst to a gas mixture of 450 ppm NO, 10% O$_2$ in a total of 200 mL/min gas flow rate. The quartz micro reactor contained 10 mg of the catalyst and 90 mg of alpha-alumina. During testing, the temperature was ramped up to 350° C. at a rate of 10° C./min, and then allowed to cool to 50° C. Thereafter, a 2$^{nd}$ ramp up is performed. The data are taken from the 2$^{nd}$ ramp up if not specified otherwise. In preparation of aged testing, the catalysts were hydrothermally aged for 10 hrs at 820° C. with 10% steam. As is known to a person of ordinary skill, platinum catalyst is one of best NO oxidation catalyst commercially available. As seen in the comparison result of FIG. 8, the NPGM catalyst of Sample 8 exhibited better performance than platinum in the high temperature range and similar performance in the lower temperature range.

Figure 9:
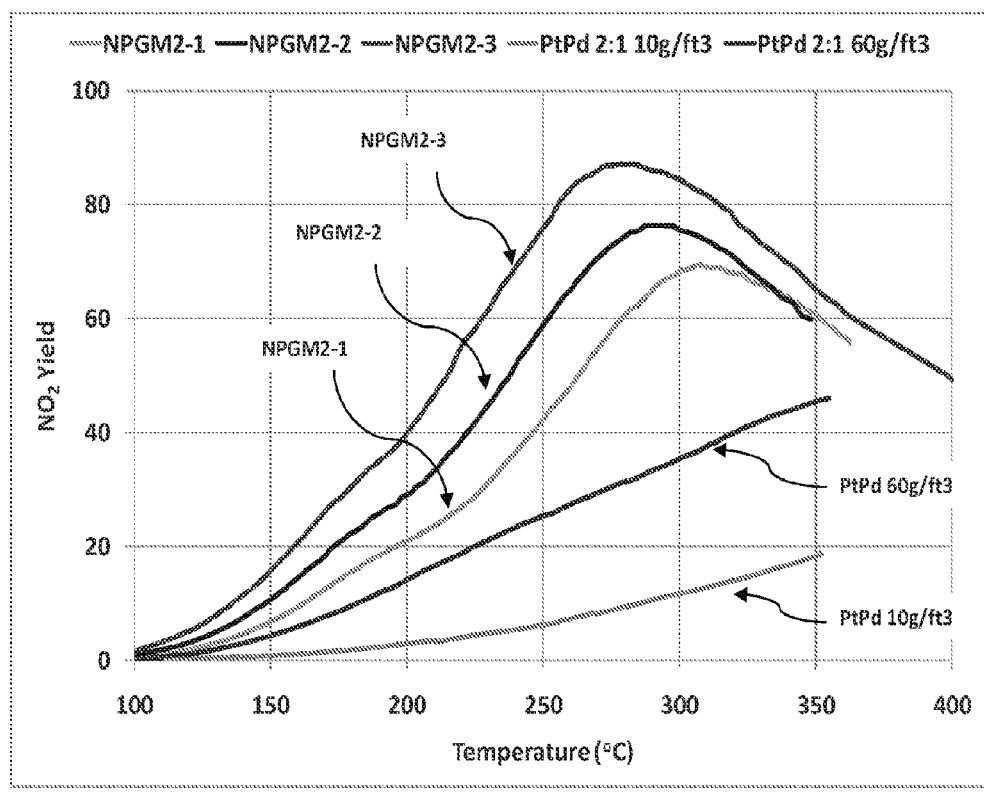
FIG. 9 illustrates the results of NO oxidation testing of an emission control catalyst according to an embodiment of the present invention and other catalysts.

FIG. 9 illustrates the results of a NO oxidation testing of the emission control catalyst of Sample 8 and a platinum-palladium catalyst having a weight ratio of 2% Pt:1% Pd at different washcoat loading levels. The catalyst of Example 1 having a washcoat loading of about 0.7 g/in$^3$ is represented by NPGM2-1. The catalyst of Example 1 having a washcoat loading of about 1.4 g/in$^3$ is represented by NPGM2-2. The catalyst of Example 1 having a washcoat loading of about 2.0 g/in$^3$ is represented by NPGM2-3. Platinum-palladium catalysts having washcoat loadings of 10 g/ft$^3$ and 60 g/ft$^3$ were used in the comparison. The results indicate that all three samples of Sample 8 performed better than the platinum-palladium catalyst with the higher washcoat loading. The results also illustrate the NPGM catalyst allows for a wide flexibility in the design of the washcoat loading.

Figure 10:
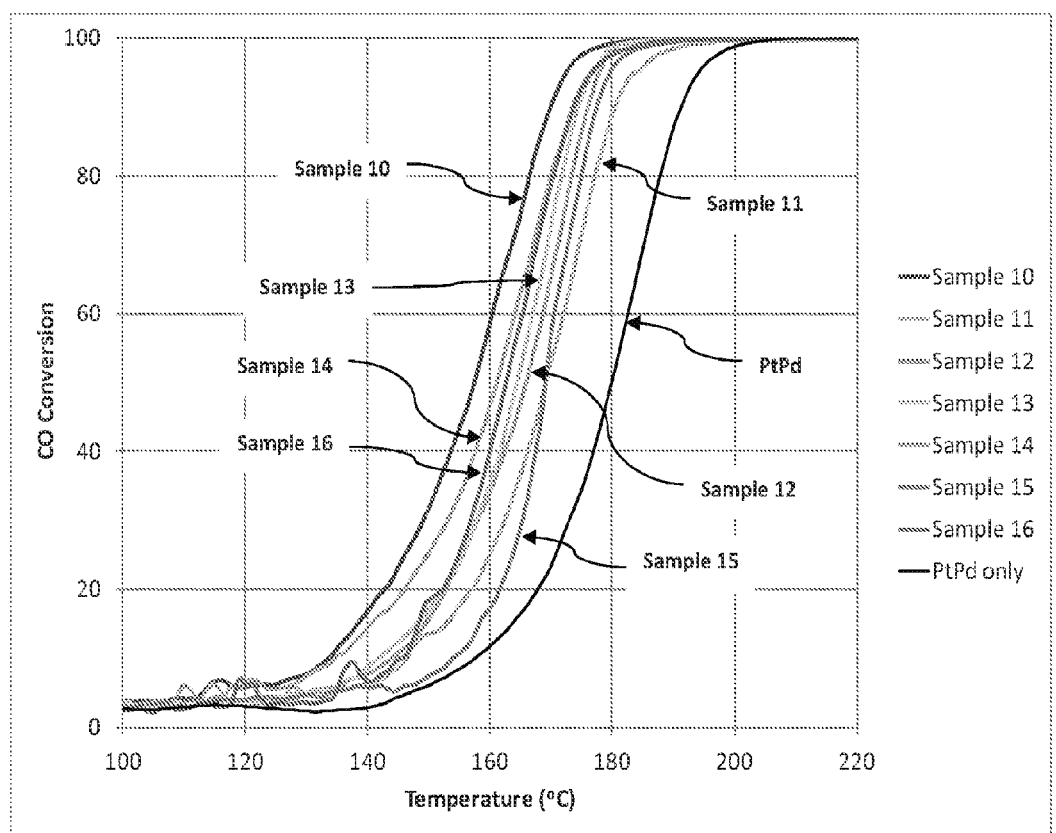
FIG. 10 illustrates the results of CO oxidation testing of an emission control catalyst according to an embodiment of the present invention and other catalysts.
Figure 11:
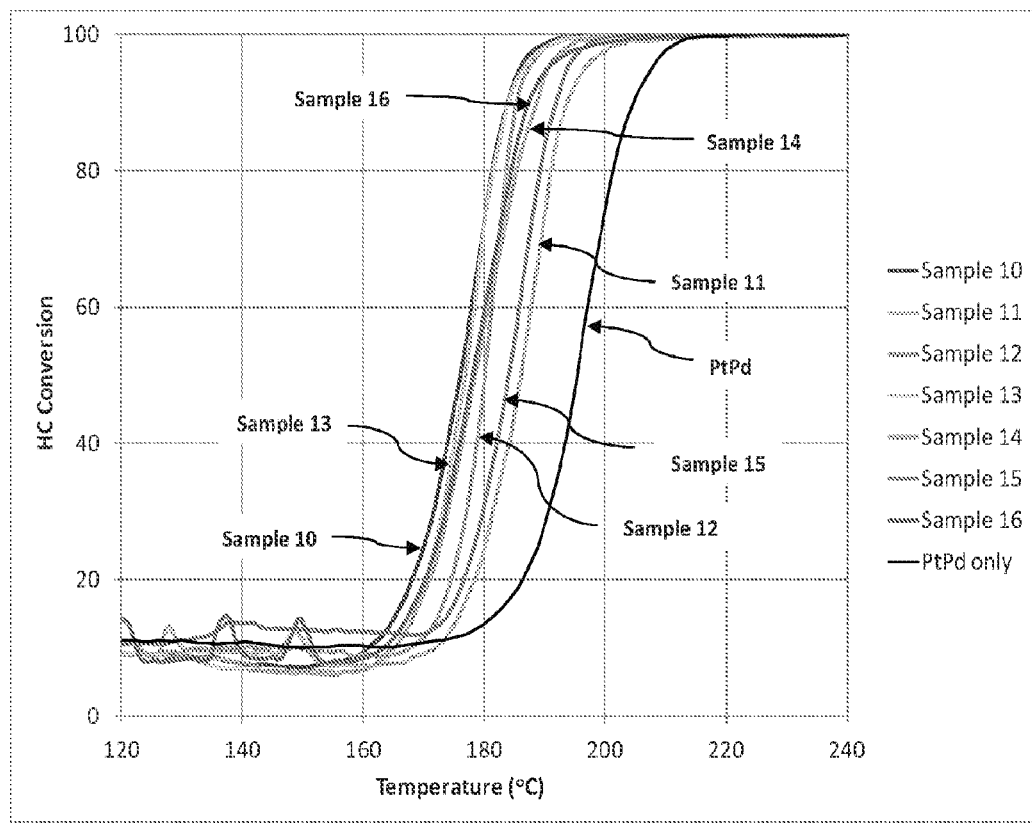
FIG. 11 illustrates the results of HC testing of the catalysts of FIG. 10.
Figure 12:
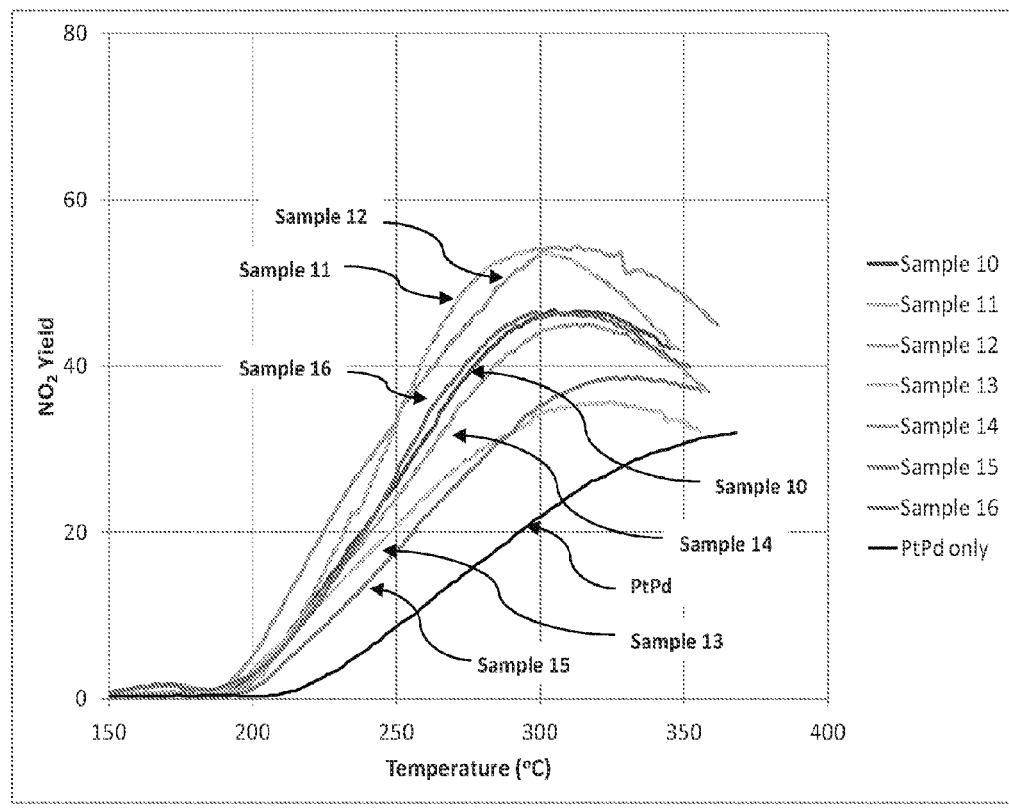
FIG. 12 illustrates the results of NO oxidation testing of the catalysts of FIG. 10.

FIGS. 10-12 illustrates the results of three different tests involving the catalyst of Samples 10-16 and a platinum-palladium (2.4% Pt:1.6% Pd) catalyst having washcoat loadings of 60 g/ft$^3$. The three tests include carbon monoxide conversion testing, hydrocarbon conversion testing, and NO oxidation testing. The testing conditions for FIGS. 10-12 include exposing the catalyst to a gas mixture of 1000 ppm CO, 105 ppm C$_3$H$_8$, 245 ppm C$_3$H$_6$, 120 ppm Xylene, 150 ppm NO, 10% O$_2$, 7% H$_2$O, and 5% CO$_2$ in a space velocity of 60,000 h$^{-1}$ based on a 0.5" diameter×1" length core. The temperature is ramped up to 350° C. at a rate of 10° C./min, and then cooled in reaction mixture to 50° C. Thereafter, a 2$^{nd}$ ramp up is performed. The data are from the 2$^{nd}$ ramp up if not specified otherwise. In preparation of aged testing, the catalysts were hydrothermally aged for 20 hrs at 800° C. with 10% steam.

For CO conversion and hydrocarbon conversion, FIGS. 10 and 11 indicate that samples 10 to 16 performed better than the platinum-palladium catalyst. Samples 10, 14 showed better CO activity than the other samples. It is believed that intimate mixing of the NPGM catalyst with the PtPd catalyst promotes CO oxidation, which contributed to the increased HC performance. For NO oxidation, FIG. 12 indicate that while all Samples showed better performance than the platinum-palladium catalyst; in this instance, Samples 11, 12, 16 showed better performance than samples 13 and 15. The results indicate that disposing the NPGM catalyst in the top layer is preferable.

Table IV contains data representing vehicle testing performance of different embodiments of Sample 10. Sample 17 is exactly the same as the configuration in Sample 10, whereas Samples 18 and 19 are slightly modified designs. Both Samples 18 and 19 have a mixture of palladium and zeolite in the top layer.

The Pd catalyst (2% in weight) is made as follows: To 9.5 L of de-ionized H$_2$O was added 1900 g gamma-alumina (having a BET surface area of ~150 m$^2$ g$^{-1}$, Sasol Puralox TH 100/150 in this particular example) followed by stirring for 20 minutes at room temperature. To this slurry was added 270.6 g of Pd(NO$_3$)$_2$ solution (14.28% Pd(NO$_3$)$_2$ by weight), followed by stirring at room temperature for 60 minutes. An aqueous ascorbic acid solution (647.2 g in 3.5 L of de-ionized H$_2$O) was then added over 25 minutes followed by stirring for 60 minutes. The solid La-doped alumina supported PtPd catalyst was then separated from the liquid via filtration, dried at 120° C. for 2 hours, ground into a fine powder, and calcined in air for 2 hours at a temperature of 500° C. (heated at 8° C. min$^{-1}$) to give a 2% Pd material.

The vehicle testing was conducted on an aged, 85 hp., 1.3 L vehicle. The engine aging procedure includes a regeneration at about 750° C. lasting for 10 minutes followed by 10 minutes of engine idle at about 150-200° C. The regeneration/idle cycle was repeated for 25 hours, then two New European Driving Cycles "NEDC" are performed. Thereafter, another 25 hours of aging were conducted followed by performing two more NEDC cycles. The 25 hours aging procedure correlates to approximately 20,000+ road kilometers for a passenger car.

TABLE IV

| | Vehicle Testing | | | | |
|---|---|---|---|---|---|
| Sample | Bottom Layer | Top Layer | CO conversion (%) | HC conversion (%) | Cost per DOC unit |
| Reference | PtPd (2:1 by weight) at 120 g/ft$^3$ | N/A | 82.5 | 88 | $146 |
| 17 | PtPd and NPGM; PtPd (3:2 by weight) at 99 g/ft$^3$ | Zeolite | 85.5 | 87 | $114 |
| 18 | PtPd and NPGM; PtPd (1:1 by weight) at 82.4 g/ft$^3$ | Zeolite + 16.6 g/ft$^3$ Pd | 86 | 87 | $104 |
| 19 | PtPd and NPGM; PtPd 1:1 by weight) at 89.4 g/ft$^3$ | Zeolite + 9.6 g/ft$^3$ Pd | 85 | 87 | $101 |

The data presented in Table IV above reflect the vehicle test performance for three variations of Sample 10 having different precious group metal loadings to determine the effect of the PGM on performance and costs (assuming cost basis of Pt:Pd of 3:1). The CO and HC emissions were measured from the tail pipe of the light-duty diesel vehicle using bag data from the standard European MVEG test. The reference catalyst is a platinum-palladium catalyst having a weight ratio of 2:1, total PGM loadings are 120 g/ft$^3$ Relative to the reference catalyst, Samples 17-19 showed better carbon monoxide performance with similar hydrocarbon performance and has substantially lower costs.

In another embodiment, an emission control catalyst for treating an engine exhaust includes a first catalytically active layer containing a zeolite; a second catalytically active layer containing non-precious metal group ("NPGM") catalyst having a first phase comprising a mullite phase; and a second phase selected from the group consisting of a fluorite phase, a spinel phase containing a metal oxide, and combinations thereof, wherein the first catalytically active layer is positioned to encounter the engine exhaust before the second catalytically active layer.

In one or more of the embodiments described herein, the second catalytically active layer further comprises a platinum-based catalyst.

In one or more of the embodiments described herein, the first catalytically active layer further comprises a palladium-based catalyst.

In one or more of the embodiments described herein, the catalyst also includes a substrate having a honeycomb structure with gas flow channels, wherein the NPGM catalyst is coated on the walls of the gas flow channels.

In one or more of the embodiments described herein, the metal oxide includes one or more transition metals.

In one or more of the embodiments described herein, the metal oxide includes one or more first row transition metals.

In one or more of the embodiments described herein, the metal oxide is selected from the group consisting of cobalt oxide and manganese oxide.

In one or more of the embodiments described herein, the metal oxide further includes a dopant selected from the group consisting of alkali metals, alkaline earth metals, and combinations thereof.

In one or more of the embodiments described herein, the dopant is selected from the group consisting of barium, cesium, strontium, calcium, rubidium, potassium, magnesium, and combinations thereof.

In one or more of the embodiments described herein, the catalyst includes a second dopant selected from the Lanthanides, transition metals, poor metals, and combinations thereof.

In one or more of the embodiments described herein, the second dopant is selected from the group consisting of Pr, Nd, Sm, Eu, Gd, Tb, Dy, Ho, Er, Tm, Yb Bi Zr, Sn, Y, La and combinations thereof.

In one or more of the embodiments described herein, the catalyst has the general formula:

$$Ce_{1-x}A_{x+a}B_{y+b}M_{z-y}O_s$$

where:
M is one or more metal elements selected from the group consisting of transition metals;
A is one or more metal elements selected from the group consisting of transition metals, poor metals, and the Lanthanide series, wherein A and M are different metals;
B is one or more metal elements selected from the group consisting of alkali metals and alkaline earth metals;
x is a number defined by $0<=x<=1$,
a is a number defined by $a=>-1$,
y and z are numbers defined by $0<=y<=z$,
b is a number defined $b=>0$, and
s is a number that renders the catalyst substantially charge neutral.

In one or more of the embodiments described herein, the catalyst includes a mullite phase.

In one or more of the embodiments described herein, A is an element or a mixture of elements selected from the lanthanide series.

In one or more of the embodiments described herein, A is selected from the group consisting of Pr, Nd, Sm, Eu, Gd, Tb, Dy, Ho, Er, Tm, Yb Bi Zr, Sn, Y, La and combinations thereof.

In one or more of the embodiments described herein, x is equal to 1.

In one or more of the embodiments described herein, M is selected from the group consisting of Ti, V, Cr, Mn, Fe, Co, Ni, Cu, Zn, and combinations thereof.

In one or more of the embodiments described herein, M is selected from the group consisting of V, Cr, Mn, Fe, Co, Ni, Cu and combinations thereof.

In one or more of the embodiments described herein, M is selected from the group consisting of Co, Mn, Cr, Fe, and combinations thereof.

In one or more of the embodiments described herein, B is an element or a mixture of elements from the alkaline earth metals.

In one or more of the embodiments described herein, B is selected from the group consisting of Ba, Sr, Ca, Cs, Rb K, and combinations thereof.

In one or more of the embodiments described herein, B is selected from the group consisting of Sr, Ba, Ca, Mg, and combinations thereof.

In one or more of the embodiments described herein, y+b=0, such that the catalyst has the general formula $$Ce_{1-x}A_{x+a}M_{z-y}O_s.$$

In one or more of the embodiments described herein, M is selected from V, Cr, Mn, Fe, Co, Ni, Cu and combinations thereof.

In one or more of the embodiments described herein, A is selected from the group consisting of Pr, Nd, Sm, Eu, Gd, Tb, Dy, Ho, Er, Tm, Yb, Bi, Zr, Sn, Y, La and combinations thereof.

In one or more of the embodiments described herein, the catalyst has a general formula:

$$(CeO_2)_d(AM_2O_5)_e(B_2M_2O_5)_f(M_3O_4)_g \qquad (II)$$

where:
d, e, f, g is a number greater or equal to zero;
A, B, and M have the same meaning as in claim 12 above;
CeO$_2$ is a fluorite phase;
A M$_2$O$_5$ and B$_2$M$_2$O$_5$ are mullite phases; and
M$_3$O$_4$ is a spinel phase.

In one or more of the embodiments described herein, the mullite phase in the general formula is selected from the group consisting of A$_2$M$_4$O$_9$, B$_2$M$_2$O$_5$, A$_2$M$_4$O$_{10}$, or AM$_2$O$_5$.

In one or more of the embodiments described herein, the metal M is in M$^{3+}$ or M$^{4+}$ states.

In one or more of the embodiments described herein, A is selected from the group consisting of Pr, Nd, Sm, Eu, Gd, Tb, Dy, Ho, Er, Tm, Yb, Bi, Zr, Sn, Y, La, and combinations thereof.

In one or more of the embodiments described herein, M is selected from V, Cr, Mn, Fe, Co, Ni, Cu and combinations thereof.

In one or more of the embodiments described herein, B is selected from Ba, Sr, Ca, Cs, Rb K, and combinations thereof.

In one or more of the embodiments described herein, the catalyst is disposed in at least one component of an engine exhaust system selected from the group consisting of a catalytic converter, a particulate filter, a selective catalytic reduction (SCR) unit, a pre-SCR unit, and an ammonia slip catalyst unit, and combinations thereof.

In another embodiment, an emission control catalyst for treating an engine exhaust includes a first catalytically active layer containing a zeolite and platinum palladium; a second catalytically active layer containing non-precious metal group ("NPGM") catalyst having a first phase comprising a mullite phase; and a second phase selected from the group consisting of a fluorite phase, a spinel phase containing a metal oxide, and combinations thereof, wherein the second catalytically active layer is positioned to encounter the engine exhaust before the first catalytically active layer.

In another embodiment, an emission control catalyst for treating an engine exhaust includes a non-precious metal group ("NPGM") disposed in one or more layers or zones of the emission control catalyst.

In one or more of the embodiments described herein, the emission control catalyst includes two layers, and the NPGM catalyst is disposed in a top layer, a bottom layer, or both.

In one or more of the embodiments described herein, the emission control catalyst includes two zones, and the NPGM is disposed in a front zone, a back zone, or both.

In one or more of the embodiments described herein, the NPGM includes a single layer or single zone emission control catalyst.

In one or more of the embodiments described herein, the emission control catalyst includes three layers, and the NPGM is disposed in at least one of a top layer, a middle layer, a bottom layer, or combinations thereof.

In one or more of the embodiments described herein, the emission control catalyst of any of claims 33-37, wherein the NPGM catalyst has a loading in a range from about 0.2 g/in$^3$ to about 5 g/in$^3$.

In one or more of the embodiments described herein, the emission control catalyst of any of claims 33-37, wherein the NPGM catalyst has a loading in a range from about 0.5 g/in$^3$ to about 3 g/in$^3$.

In one or more of the embodiments described herein, the emission control catalyst of any of claims 33-37, wherein the NPGM catalyst has a loading in a range from about 0.7 g/in$^3$ to about 1 g/in$^3$.

While particular embodiments according to the invention have been illustrated and described above, those skilled in the art understand that the invention can take a variety of forms and embodiments within the scope of the appended claims.

What is claimed is:

1. An engine exhaust catalyst, comprising:
   a fluorite phase containing a cerium oxide;
   a spinel phase containing a metal oxide; and
   a mullite phase;
   wherein the catalyst has the general formula:

$Ce_{1-x}A_{x+a}B_{y+b}M_{z-y}O_s$ where:
   M is one or more metal elements selected from the group consisting of transition metals;
   A is one or more metal elements selected from the group consisting of transition metals, poor metals, and the Lanthanide series, wherein A and M are different metals;
   B is one or more metal elements selected from the group consisting of alkali metals and alkaline earth metals;
   x is a number defined by $0 \leq x < 1$,
   a is a number defined by $a \geq -1$,
   y and z are numbers defined by $0 \leq y \leq z$,
   b is a number defined $b \geq 0$, and
   s is a number that renders the catalyst substantially charge neutral.

2. The catalyst of claim 1, wherein the metal oxide includes one more transition metals.

3. The catalyst of claim 2, wherein the metal oxide is selected from the group consisting of cobalt oxide and manganese oxide.

4. The catalyst of claim 2, wherein the metal oxide further includes a dopant selected from the group consisting of alkali metals, alkaline earth metals, and combinations thereof.

5. The catalyst of claim 1, wherein x+a=0, such that the catalyst has the general formula $Ce_{1-x}B_{y+b}M_{z-y}O_s$.

6. The catalyst of claim 1, wherein M is selected from Cobalt or Manganese.

7. The catalyst of claim 6, wherein B is selected from the group consisting of barium, cesium, strontium, and combinations thereof.

8. The catalyst of claim 7, wherein A is selected from the group consisting of samarium, zirconium, tin, yttrium, Gadolinium and combinations thereof.

9. The catalyst of claim 1, wherein the catalyst has a general formula:

$(CeO_2)(A_TB_{1-T}M_2O_5)(M_3O_4)$      (II)

where:
T is between 0 and 1;
$A_TB_{1-T}M_2O_5$ is a mullite phase;
M in the mullite phase is in $M^{3+}$ or $M^{4+}$ states; and
A and B in the mullite phase are selected from the group consisting of alkali metals, alkaline earth metals, poor metals, transition metals, lanthanides, and their combinations.

10. The catalyst of claim 9, where the mullite phase in the general formula is selected from the group consisting of $A_2M_4O_9$, $A_2M_4O_{10}$, and $AM_2O_5$.

11. The catalyst of claim 10, wherein the metal M is selected from the group consisting of $Mn^{3+}$, $Fe^{3+}$, $Co^{3+}$, $Al^{3+}$, $Ga^{3+}$, and combinations thereof.

12. The catalyst of claim 10, wherein
M is selected from the group consisting of Mn, Fe, Co, Al, Ga, and combinations thereof; and
A is selected from the group consisting of Sm, Sr, Nd, Pr, Eu, Tb, Ho, Er, Bi, Gd, La, and combinations thereof.

13. A mixed phase catalyst, comprising the general formula:

$Ce_{1-x}A_{x+a}B_{y+b}M_{z-y}O_s$ where:
M is one or more metal elements selected from the group consisting of transition metals;
A is one or more metal elements selected from the group consisting of transition metals, poor metals, and the Lanthanide series, wherein A and M are different metals;

B is one or more metal elements selected from the group consisting of alkali metals and alkaline earth metals;

x is a number defined by $0 \leq x < 1$, a is a number defined by $a \geq -1$, y and z are numbers defined by $0 \leq y \leq z$, b is a number defined $b => 0$, and s is a number that renders the catalyst substantially charge neutral, wherein the catalyst includes a spinel phase containing a transition metal and a mullite phase.

14. The mixed phase catalyst of claim 13, further comprising a fluorite phase containing cerium oxide.

15. An emission control catalyst for treating an engine exhaust comprising:

a first catalytically active layer containing a zeolite;

a second catalytically active layer containing non-precious metal group ("NPGM") catalyst having a first phase comprising a mullite phase; and a second phase selected from the group consisting of a fluorite phase, a spinel phase containing a metal oxide, and combinations thereof, wherein the first catalytically active layer is positioned to encounter the engine exhaust before the second catalytically active layer.

16. The catalyst of claim 15, wherein the metal oxide further includes a dopant selected from the group consisting of alkali metals, alkaline earth metals, and combinations thereof.

17. The catalyst of claim 15, wherein the catalyst has the general formula:

$Ce_{1-x}A_{x+a}B_{y+b}M_{z-y}O_s$ where:

M is one or more metal elements selected from the group consisting of transition metals;

A is one or more metal elements selected from the group consisting of transition metals, poor metals, and the Lanthanide series, wherein A and M are different metals;

B is one or more metal elements selected from the group consisting of alkali metals and alkaline earth metals;

x is a number defined by $0 <= x <= 1$, a is a number defined by $a => -1$, y and z are numbers defined by $0 <= y <= z$, b is a number defined $b => 0$, and s is a number that renders the catalyst substantially charge neutral.

18. The catalyst of claim 17, wherein y+b=0, such that the catalyst has the general formula $Ce_{1-x}A_{x+a}M_{z-y}O_s$.

19. The catalyst of claim 17, wherein the catalyst has a general formula:

$(CeO_2)_d(AM_2O_5)_e(B_2M_2O_5)_f(M_3O_4)_g$ (II)

where:

d, e, f, g is a number greater or equal to zero;

A, B, and M have the same meaning as in claim 18 above;

$CeO_2$ is a fluorite phase;

$AM_2O_5$ and $B_2M_2O_5$ are mullite phases; and $M_3O_4$ is a spinel phase.

20. The catalyst of claim 19, wherein A is selected from the group consisting of Pr, Nd, Sm, Eu, Gd, Tb, Dy, Ho, Er, Tm, Yb, Bi, Zr, Sn, Y, La, and combinations thereof.

21. The catalyst of claim 19, wherein M is selected from V, Cr, Mn, Fe, Co, Ni, Cu and combinations thereof.

* * * * *